United States Patent [19]
Minakuchi et al.

[11] Patent Number: 4,636,696
[45] Date of Patent: Jan. 13, 1987

[54] SERVO SYSTEM
[75] Inventors: Hiroshi Minakuchi, Shiga; Tadashi Kunihira, Osaka; Yoshiaki Igarashi, Ikoma, all of Japan
[73] Assignee: Matsushita Electric Industrial Co., Ltd., Osaka, Japan
[21] Appl. No.: 785,900
[22] Filed: Oct. 9, 1985
[30] Foreign Application Priority Data
Oct. 12, 1984 [JP] Japan .................................. 59-214544
[51] Int. Cl.$^4$ .............................................. H02P 5/00
[52] U.S. Cl. .................................... 318/327; 318/341; 318/608; 318/605; 318/661; 318/603
[58] Field of Search ............... 318/327, 328, 329, 341, 318/601, 603, 604, 605, 606, 607, 608, 609, 636, 661, 85, 309, 310, 311, 314

[56] References Cited
U.S. PATENT DOCUMENTS
4,529,922 7/1985 Ono .................................. 318/329 X
FOREIGN PATENT DOCUMENTS
2716670 11/1977 Fed. Rep. of Germany ...... 318/327

Primary Examiner—William M. Shoop, Jr.
Assistant Examiner—Patrick C. Keane
Attorney, Agent, or Firm—Wenderoth, Lind & Ponack

[57] ABSTRACT

A servo system for controlling the rotational speed of a rotating body or the moving speed of a moving body to be a desired speed. The system comprises a voltage source which generates at least two predetermined voltages, a comparator which compares a voltage of an AC signal containing a speed information of the moving body with each of the voltages generated by the voltage source and outputs at least two output signals in each half period of the AC signal, a counter for counting reference clock signals, a memory for storing a count value of the counter when the comparator outputs each of the output signals, a processor for producing a speed error signal from the count value stored in the memory, and a driver for supplying a driving power to the moving body in accordance with the speed error signal thereby to keep a desired speed of the moving body. Further, an error compensator may be provided for compensating a voltage shift of the predetermined voltages.

9 Claims, 31 Drawing Figures

FIG. I.

| j e g f | D AREA | E AREA | F AREA | |
|---------|--------|--------|--------|---|
| 1 1 0 1 | 701 | 711 | 721 | |
| X 1 1 0 | 702 | 712 | 722 | |
| 0 1 0 1 | 703 | 713 | 723 | |
| 0 1 0 0 | 704 | 714 | 724 | |
| 1 0 0 1 | 705 | 715 | 725 | |
| X 0 1 0 | 706 | 716 | 726 | |
| 0 0 0 1 | 707 | 717 | 727 | |
| 0 0 0 0 | 708 | 718 | 728 | |
| | 710 | 720 | 730 | G AREA |
| | B AREA | C AREA | 731 | H AREA |
| | | | 732 | I AREA |
| | | | 733 | J AREA |

NEXT

NEXT

NEXT

NEXT

SERVO SYSTEM

BACKGROUND OF THE INVENTION

1. Field of the Invention

This invention relates to a servo system which controls the rotational speed of a rotational body such as a rotating motor or the moving speed of a linear moving body such as a linear motor so that the rotational or moving speed becomes a desired speed.

2. Description of the Prior Art

A servo system for controlling the rotational speed of a rotational body has conventionally a speed detector which generates an AC signal whose voltage or frequency represents the rotational speed of the rotational body. This system is called the tachogenerator servo. There are two kinds of speed detection method—voltage detection method and frequency or period detection method.

There are some examples of the voltage detection method. For example, the amplitude of the output AC signal of the speed detector which possesses a generating coil changes in corresponding with the moving speeds. When this AC signal reached a predetermined voltage, a switching transistor is operated to charge a capacitor. When the switching transistor is in OFF condition, the charging of capacitor is carried out by a constant resistor. With this construction, an error voltage depending on the moving speed is obtained (for example, disclosed in Japanese Published Patent No. 58-6392). Another method obtains the error voltage by rectifying the output AC signal of the speed detector. Still another method directly uses the generated AC voltage of the speed detector (for example, disclosed in U.S. Pat. No. 2,905,876). In this example a chopper is used to use the controlled motor as the speed generator during its unenergized period.

However, in these systems the generated voltage of the speed detector used as a speed information changes easily due to the change of ambient temperature and long use. Thus, they can only be used as low grade servo systems.

The frequency or period detection method uses the frequency or the repeated period of the output AC signal of the speed detector as a speed information. Digital servo systems using this method (for example disclosed in Japanese Published Patent No. 53-19745 or U.S. Pat. No. 3,836,756) have the advantage of very high stability. The frequency or period detection method produces a speed error from specified edges of the well-amplified (to have a square waveform) output AC signal of the speed detector. For example, a representative period detection method counts clock pulses in a period from one leading edge of the amplified output signal of the speed detector to the next leading edge, the count value corresponding to the moving speed of the moving body. From this count value a pulse width modulation signal is produced (in the case of the chopper type driving method) or the count value is converted to an analog voltage thereby to obtain the speed error output.

Therefore, if we try to realize a higher resolution control, it is necessary to increase the number of edges. For example, when the AC generator which generates one cycle of AC signal in one revolution of the motor is used in the edge detection method, it is impossible to obtain two or more speed error signals during one revolution of the motor. By using both the leading edge and the trailing edge of the square wave signals, at most two speed error signals could be obtained.

Other conventional methods are the method of using PLL (Phase Locked Loop) to multiply the frequency of the output AC signal of the speed detector (disclosed in U.S. Pat. No. 4,114,075) and the method of obtaining the speed detection signal from two kinds of AC signals which differ in phase by $\pi/2$, the speed detection signal thus having four times frequency (for example, disclosed in Japanese Published Patent No. 58-6165). However, since the speed information obtained from the multiplied signal is dependent on the speed information of the original signal, no effect is obtained in the purpose of improving resolution of control. In the latter method, the construction of the speed detector is relatively complicated and, compared with the previously explained method of using both the leading and trailing edges of the output AC signal of the speed detector, the resolution is improved by only two times higher.

Because of the above, so far efforts have been made for increasing the output frequency of the speed detector. However, even though the output frequency of the speed detector is increased, large effect will not be expected. Also, the construction of the speed detector becomes complicated. (For example, by radiating laser beam onto the speed detection track which is formed by photomask etching, and detecting its reflective light, frequency of speed detector greatly increases, but the system construction becomes much complicated. Moreover, high precision manufacturing technique is required for such systems.

SUMMARY OF THE INVENTION

An object of the present invention is to provide a servo system which can carry out a precision speed control of a rotational or moving body without increasing the output frequency of the speed detector.

This object is accomplished by a servo system comprising: a discriminator measuring a period of an AC signal which contains a speed information of a moving body, setting at least two reference points within a half period of the AC signal and generating an error signal in correspondence with a deviation from a desired value at each of the reference points; a driver for driving the moving body in accordance with the error signal.

A preferable servo system of the invention comprises: a voltage source which generates at least two kinds of predetermined voltages; a comparator for comparing a voltage of an AC signal which contains a speed information of the moving body with each of the predetermined voltages generated by the voltage source and generating at least two output signals within a half period of the AC signal; a counter for counting reference clock signals; a memory for storing a count value of the counter when the comparator generates each of the output signals; a processor for calculating a speed error value from the count value stored in the memory; and a driver for supplying a driving power to the moving body in accordance with the speed error value thereby to keep a desired speed of the moving body.

More preferably, the servo system of the invention further comprises an error compensator for compensating the speed error value by detecting a voltage shift of the predetermined voltages generated by the voltage source.

This invention uses a comparison signal which is obtained by comparing the AC signal outputted from a speed detector with the predetermined voltage generated by the voltage source, and compensates the setting error of the voltage source so that high resolution speed control can be achieved without increasing the frequency of the AC signal generated by the speed detector.

The above and other objects, features and advantages will be apparent from consideration of the following description taken in connection with the accompanying drawings in which:

BRIEF DESCRIPTION OF THE DRAWINGS

FIG. 14 and FIG. 15 are characteristic diagrams showing changing characteristic of intervals with respect to speed changes in each divided section in the second example.

DESCRIPTION OF THE PREFERRED EMBODIMENTS

Figure 1:
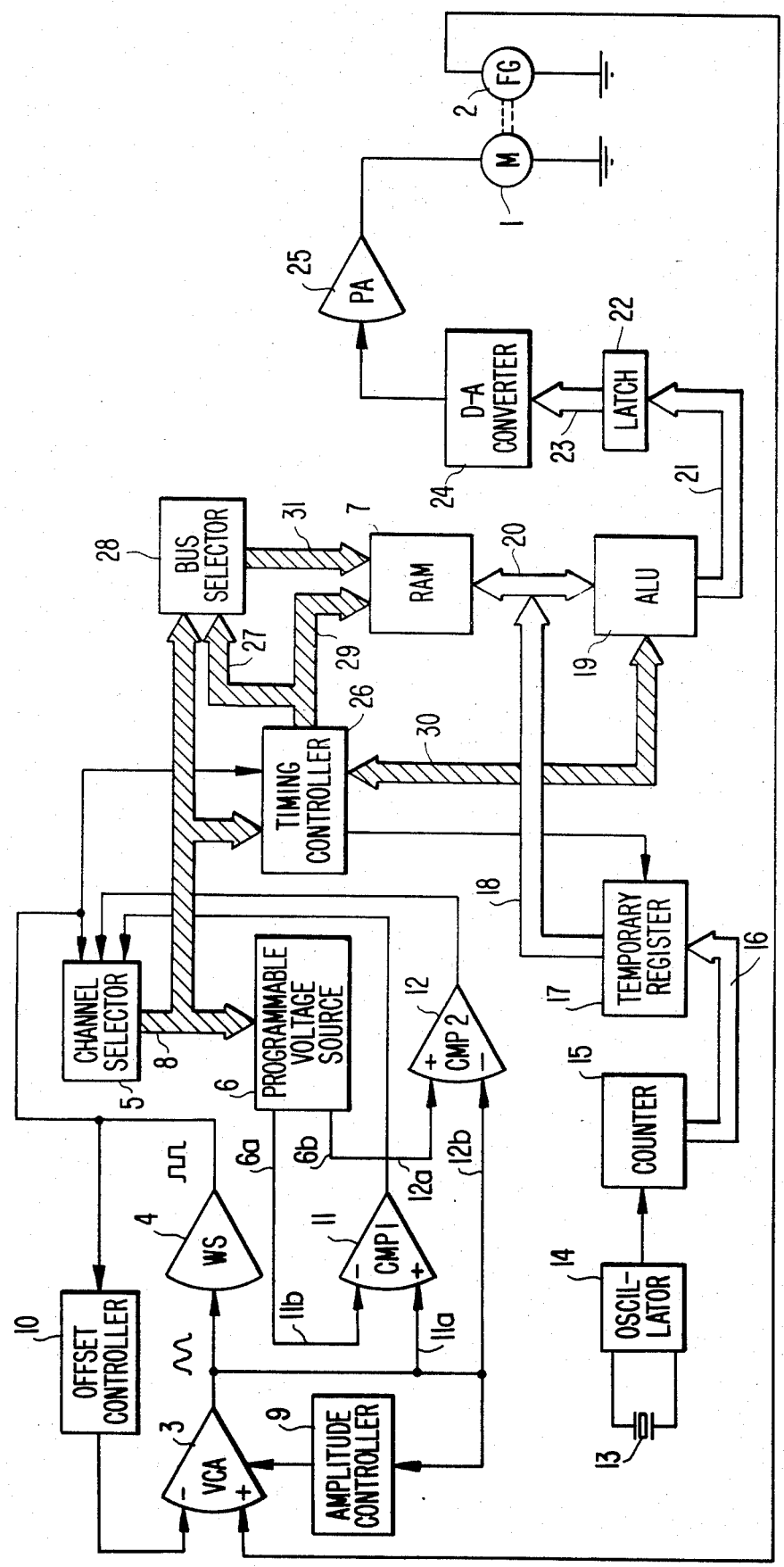
FIG. 1 is a block diagram showing an embodiment of the servo system according to this invention.

FIG. 1 shows a block diagram showing an embodiment of this invention. An output of a speed detector 2 (generally called frequency generator or simply FG) which is coupled to a motor 1 is amplified until the amplitude becomes a constant amplitude by a voltage controlled amplifier 3 (in the figure, shown by abbreviated symbol VCA), and then amplified to be a square wave by a waveform shaper 4 (in the figure, indicated by abbreviated symbol WS). The output of the waveform shaper 4 is supplied to a channel selector 5 as a reset signal.

The channel selector 5 mainly generates channel selection signals for a programmable voltage source 6 and an address selection signal for a random-access memory (abbreviated as RAM) 7. These selection signals are supplied to the programmable voltage source 6 and the RAM 7 through a control bus 8.

The output of the voltage controlled amplifier 3 is supplied to an amplitude controller 9. The gain of the voltage controlled amplifier 3 is adjusted by the amplitude controller 9 so that the amplitude becomes constant. The output of the waveform shaper 4 is supplied to an offset controller 10. The offset of the input stage of the voltage controlled amplifier 3 is adjusted so that the duty of the square waveform signal becomes 1:1.

Thus, the output signal of the voltage controlled amplifier 3, amplitude and offset of which are adjusted, is supplied to a non-inverting input terminal 11a of a first comparator 11 (in the figure, indicated by CMP1) and to an inverting input terminal 12b of a second comparator 12 (in the figure, indicated by CMP2).

Furthermore, to an inverting input terminal 11b of the comparator 11 the output signal from an upper side output terminal 6a of the programmable voltage source 6 is supplied. To a noninverting input terminal 12a of the comparator 12 the output signal from a lower side output terminal 6b of the programmable voltage source 6 is supplied. At the comparator 11 and the comparator 12, comparisons of the output signal and the voltage of the voltage controlled amplifier 3 are carried out. Comparison output signals are supplied to the channel selector 5 as a channel renewal signal.

On the other hand, an output of an oscillator 14 which possesses a crystal oscillator 13 is supplied to a counter 15 as a clock signal. The output of the counter 15 from most significant bit (abbreviated as MSB) to least significant bit (abbreviated as LSB) is supplied to a temporary register 17 through a data bus 16, and the output of the temporary register 17 is supplied to an arithmatic logic unit (indicated by ALU) 19 through a data bus 18 and to a two-way data bus 20 which connects the ALU 19 with the RAM 7. The output of the ALU 19 is supplied to a latch 22 through a data bus 21. The output of the latch 22 is supplied to a digital-analog (D/A) converter 24 through a data bus 23. The output of the D/A converter 24 is amplified by a power amplifier 25 (in the figure, indicated by abbreviated symbol PA), and then supplied to the motor 1 as a driving power.

Further, a trigger signal and control signals of the channel selector 5 are supplied to a timing controller 26 through the control bus 8. The output signal of the waveform shaper 4 is supplied to the timing controller 26. Then a control signal of the timing controller 26 is supplied to the temporary register 17, and other control signals from the timing controller 26 are supplied to a bus selector 28 through a control bus 27 and to the RAM 7 through a control bus 29. The timing controller 26 and the ALU 19 are connected through a two-way control bus 30.

Further, once the output signals of the channel selector 5 are supplied to the bus selector 28 through the control bus 8, the output signals of the bus selector 28 are supplied to the RAM 7 through a control bus 31 and the bus selector 28 acts as a relay which possesses input switching function. When the control data from the timing controller 26 is sent out through the control bus 27, it cuts off the input of the control bus 8, and then the input of the control bus 27 is sent to the control bus 31. In other usual operations, the signal of the control bus 8 is always directly sent to the control bus 31.

When the trigger signal is inputted, the timing controller 26 transfers a count value of the counter 15 to the temporary register 17 and, at the same time, the ALU 19 carrys out the computation of a desired value for speed control and the previous count value which is stored in the RAM 7. After the computed result is transferred to the latch 22, the timing controller 26 acts as a sequencer to transfer the count value which is stored in the temporary register 17 to the RAM 7. At the starting of the motor 1, as will be described later, the ALU 19 computes the deviation from a predetermined value of generating time of the trigger signal from the channel selector 5 in at least a half period of the output signal of the voltage controlled amplifier 3. The timing controller 26 also has the function of storing the computed result in an initial error storage area of the RAM 7.

Figure 2:
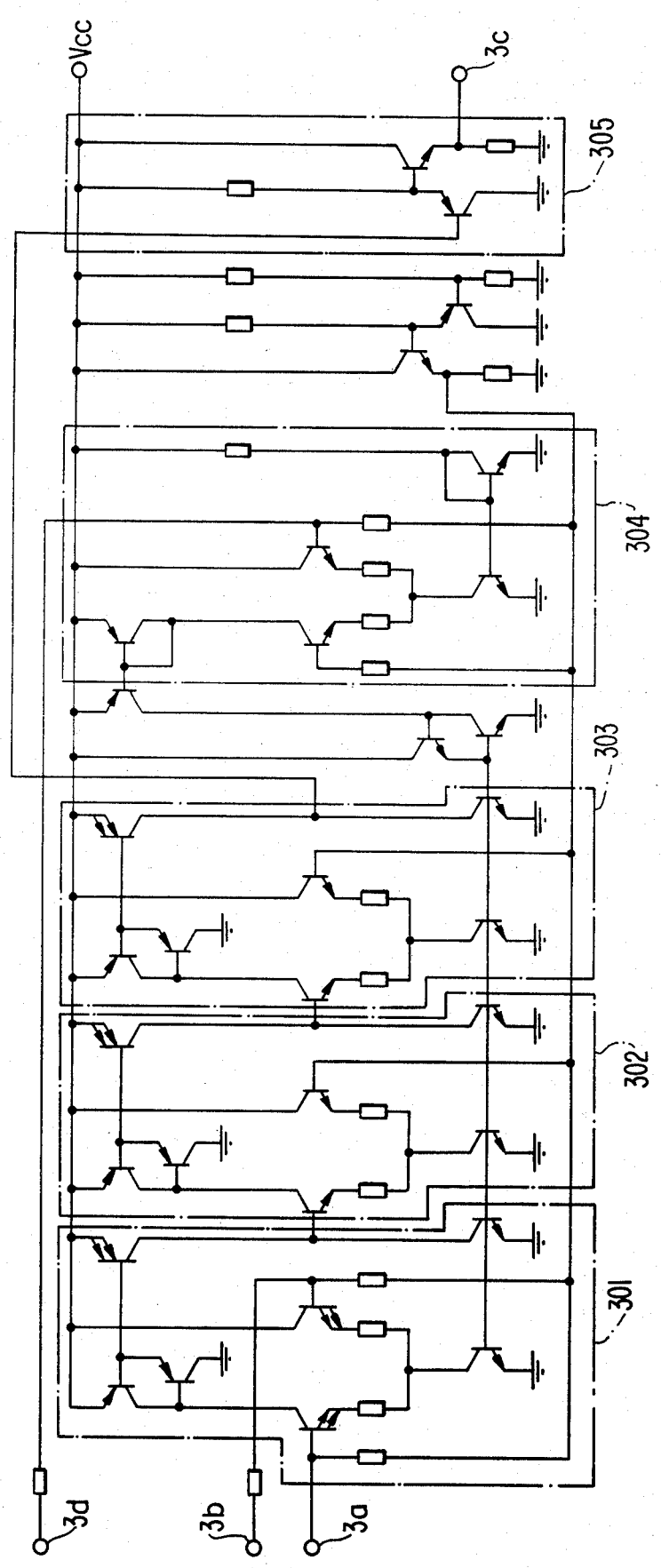
FIG. 2 is a circuit diagram showing an example of voltage controlled amplifier.

FIG. 2 shows a circuit diagram showing an example of the voltage controlled amplifier 3. Input terminals 3a, 3b are supplied with the output signal of the speed detector 2 and the output signal of the offset controller 10 of FIG. 1, respectively. An input terminal 3d is supplied with the output signal of the amplitude controller 9 of FIG. 1. A terminal Vcc is a positive power supply terminal. At the voltage controlled amplifier 3 shown in FIG. 2, a first differential amplifier 301, a second differential amplifier 302 and a third differential amplifier 303 construct a principle portion. A fourth differential amplifier 304 is provided for supplying bias current, which is dependent on the error voltage from the amplitude controller 9 supplied to the input terminal 3d, to the differential amplifier 301–303. An output part 305 of the voltage controlled amplifier 3 is constructed by an emitter follower type buffer amplifier.

Figure 3:
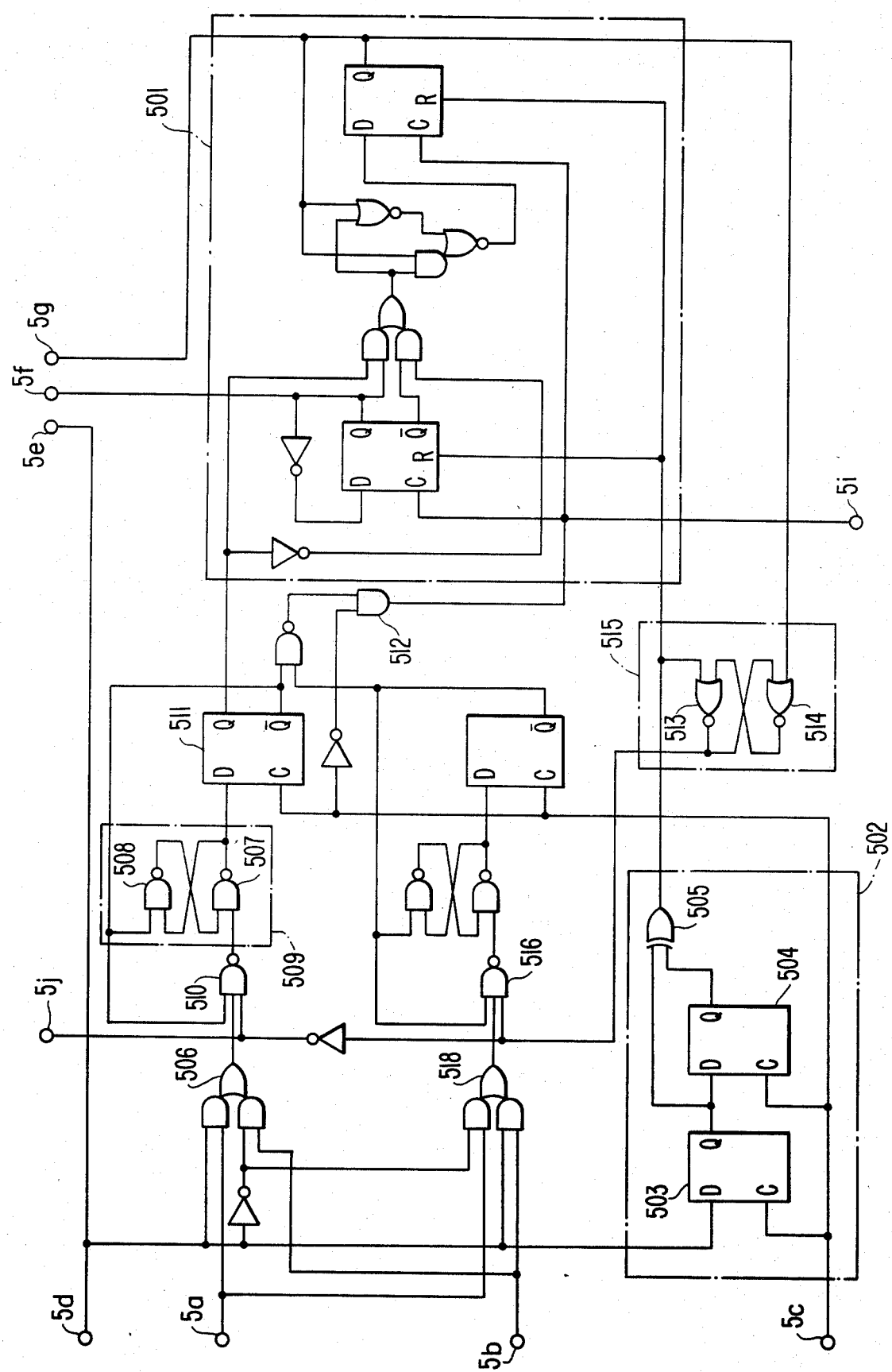
FIG. 3 is a circuit diagram showing an example of channel selector.

FIG. 3 shows a circuit diagram showing an example of the channel selector 5 of FIG. 1. Input terminals 5a, 5b are supplied with the output signals of the comparator 11, 12 of FIG. 1, respectively. An input terminal 5c is supplied with a system clock signal (not indicate in FIG. 1, for example, which can divert the output signal of suitable bits of the counter 15). An input terminal 5d is supplied with the output signal of the waveform shaper 4 of FIG. 1.

The channel selector shown in FIG. 3 is formed from a 2-bit up-down counter 501 and a part of reset signal generator 502. The outputs of the first and second bits of the up-down counter 501 are supplied to output terminals 5f, 5g, respectively. A clock signal, which is supplied to the up-down counter 501, is supplied to the timing controller 26 of FIG. 1 through an output terminal 5i. An output terminal 5e is directly connected to an input terminal 5d.

Further, the output signals (output data) appear at output terminals 5e–5g are supplied to the programmable voltage source 6 through the control bus 8 of FIG. 1, where five selective signals are generated. On the other hand, an output terminal 5j is set up. The output signals appear at output terminals 5e–5g and 5j are supplied to the RAM 7 through the control bus 8, where eight selective address signals are generated.

Figure 4:
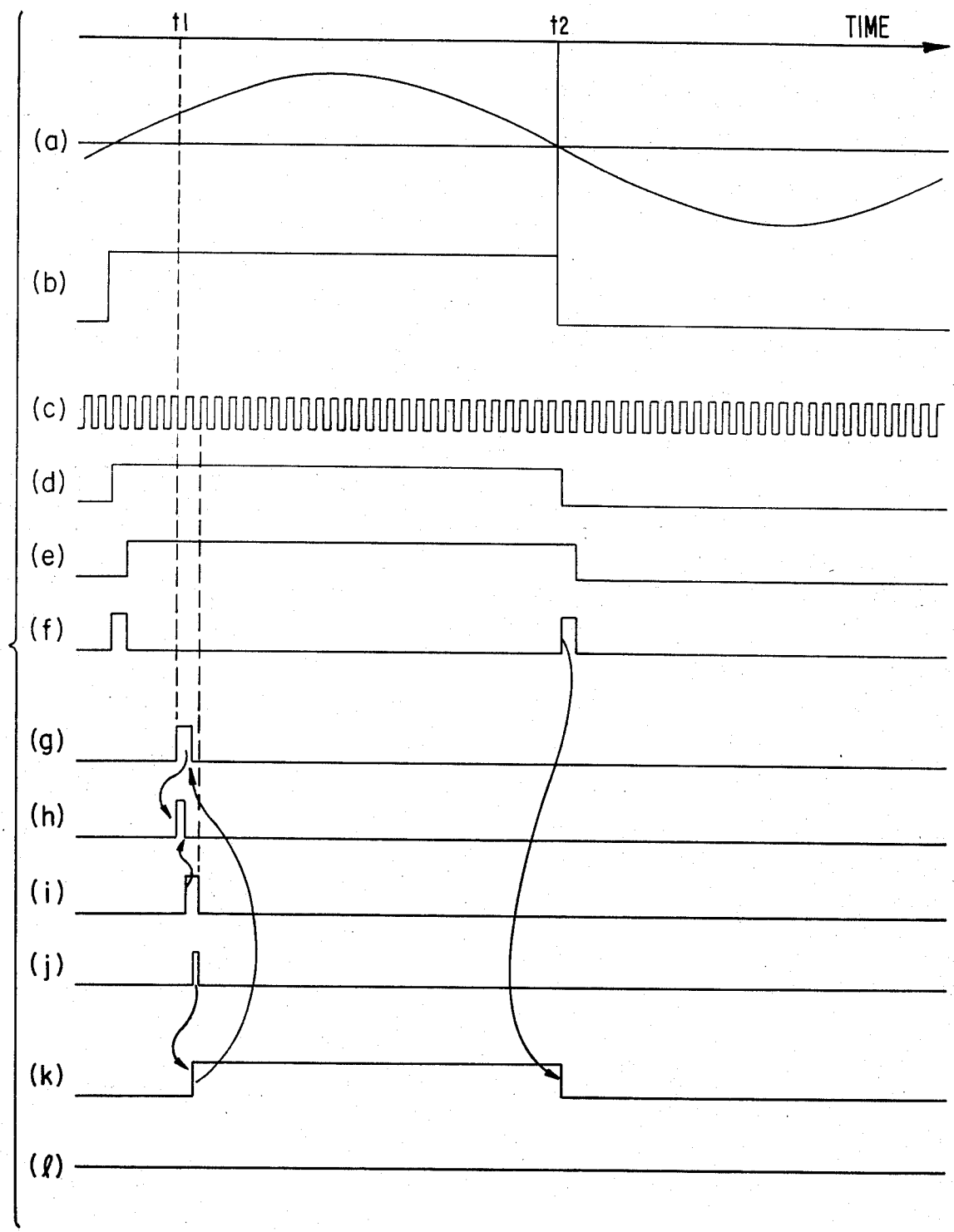
FIGS. 4a-l are signal waveform diagrams for explaining operation of the circuit in FIG. 3.

FIG. 4 is a signal waveform diagram for explaining the operation of the channel selector indicated in FIG. 3. FIG. 4a shows the output signal waveform of the voltage controlled amplifier 3 of FIG. 1 and the intermediate electric potential is half of the source voltage. FIG. 4b is the output signal waveform of the waveform shaper 4 of FIG. 1, that is a signal waveform which is supplied to the input terminal 5d of FIG. 3. FIG. 4c is the signal waveform of the clock signal which is supplied to the input terminal 5c. FIGS. 4d, 4e show the changes of the output levels of D flip-flop 503 and 504, respectively. FIG. 4f shows the output signal waveform which appears at the output terminal of an EX-OR gate 505.

In the explanation of the operations of all the following logic circuits positive logic is used. When each output terminal or each signal line is at high electric potential, it is in active state. And, high electric potential state is represented by "1" and low electric potential state is represented by "0".

FIG. 4g shows the signal waveform which is supplied to the input terminal 5a of FIG. 3. At time $t_1$, when the level of the input terminal 5a shifts to "1" and the output signal level of an AND-OR gate 506 also shifts to "1", a flip-flop 509 which is constructed by a NAND gate 507 and 508 is set by a NAND gate 510. The level of D terminal of a D flip-flop 511 shifts to "1" as indicated in FIG. 4h. After the level of D terminal of D flip-flop shifted to "1", when the leading edge of the clock signal arrives, an output level of D terminal of D flip-flop 511 shifts to "1", as indicated in FIG. 4i. Consequently, the flip-flop 509 is reset again. Therefore, when the next leading edge of the clock signal arrived, the output level of the D flip-flop 511 also returns to "0". At the output terminal of an AND gate 512, signal waveform indicate in FIG. 4j appears. The output signal of the AND gate 512 becomes the clock signal of the up-down counter 501. When the output level of the D flip-flop 511 is at "1", because the up-down counter 501 is in holding state of up-count operation, as soon as the output level, of the AND gate 512 shifted to "1", the count value of the up-down counter 501 counts up from [0, 0] and becomes [0, 1]. Further, FIGS. 4k, 4l show the first and second bits of the output levels of the up-down counter 501, respectively.

In the signal waveform diagram shown in FIG. 4g, as soon as the count value of the up-down counter 501 became [0, 1] its level is shifted to "0", as will be described later. This is because by the changing of the data of the output terminals 5e–5g, the output voltage of the programmable voltage source 6 of FIG. 1 rises and the output level of the comparator 11 returns to "0". Thus, at time $t_1$ when the level of the input terminal 5a shifts to "1", the up-down counter 501 counts up. At time $t_2$, as soon as the level of the input terminal 5d shifted to "0", because the EX-OR gate 505 generates reset signal, the up-down counter 501 is reset to [0, 0].

Further, in the above, we have assumed that the level of the input terminal 5a has changed and the same thing can be said when the level of the input terminal 5b has changed. But, because a flip-flop 515 which is constructed by NOR gates 513 and 514 is supplying the enable signals of the NAND gate 510 for the input acceptance of up-count side and a NAND gate 516 for the input acceptance of down count side, after the EX-OR gate 505 generates reset signal and until the counted value of the up-down counter 501 becomes [1, 0], only up-count input is accepted. When the count value of the up-down counter 501 becomes [1, 0], the output state of the flip-flop 515 inverts. After that it accepts down-count input only.

In the circuit of FIG. 3, the up-count operation is carried out by the signal which is supplied to the input terminal 5a from the AND-OR gates 506 and 518, and the down-count operation is carried out by the signal which is supplied to the input terminal 5b. In the other way, when the level of input terminal 5d is at "0", the down-count operation is carried out by the signal which is supplied to the input terminal 5a, and the up-count operation is carried out by the signal which is supplied to the input terminal 5b.

Figure 5:
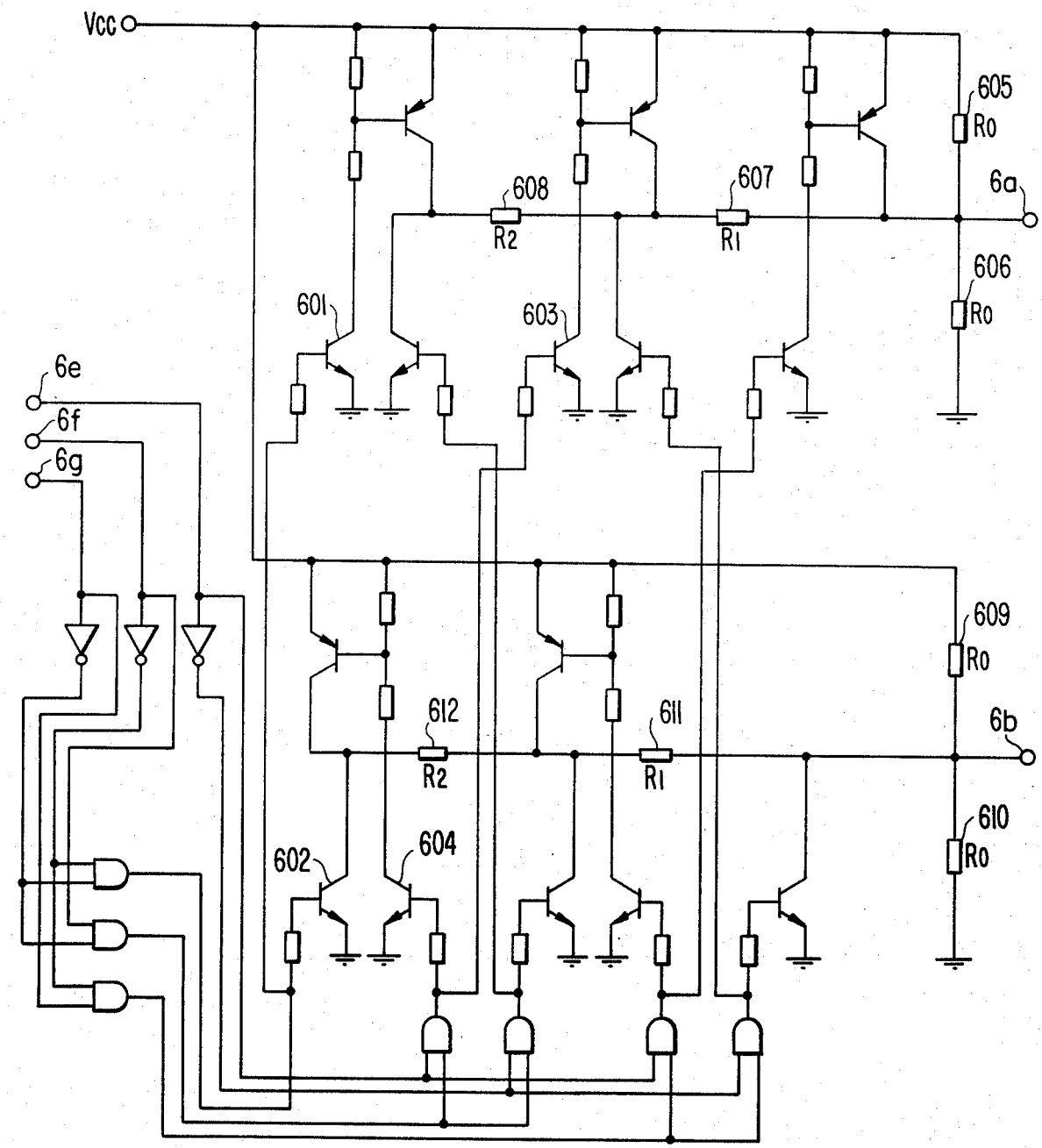
FIG. 5 is a circuit diagram showing an example of programmable voltage source.

FIG. 5 is a circuit connection diagram showing a concrete example of the programmable voltage source 6 of FIG. 1. The output terminals 6a, 6b are for supplying output signals to the comparators 11, 12 of FIG. 1, respectively. The terminal Vcc is the positive power supply terminal. Input terminals 6e, 6f, 6g are supplied with channel selective signals from the output terminals 5e, 5f, 5g of the channel selector of FIG. 3, respectively.

In FIG. 5, three inverters and seven AND gates all are used as a channel decoder. For example, when both the levels of the input terminals 6f, 6g are at "0", no effect on the level of the input terminal 6e, transistor 601 and 602 become ON state. At this moment, the electric potential of the output terminal 6a rises up slightly higher than the intermediate electric potential and electric potential of the output terminal 6b becomes a value which is slightly lower than the intermediate electric potential. Both the levels of the input terminals 6e and 6f are "1" and when the level of the input terminal 6g is "0", transistor 603 and 604 become ON state. The electric potential of the input terminal 6a rises up further and the electric potential of the input terminal 6b becomes a value which is slightly higher than the intermediate electric potential.

In the circuit of FIG. 5, if we consider the ON resistance of each switching transistor is very small, the step electric potential appearing at the output terminal 6a is determined by the value of resistances 605, 606, 607 and 608. The step electric potential which appears at the output terminal 6b is determined by the value of resistances 609, 610, 611 and 612. And, as shown in FIG. 5 at the output terminal 6a side and 6b side, by setting up the resistance values of resistors which construct the resistance network to be equal, for example, when the output electric potential of the output terminal 6a is stepped up the output of the output terminal 6b follows the potential change at the output terminal 6a.

Figures 6, 7:
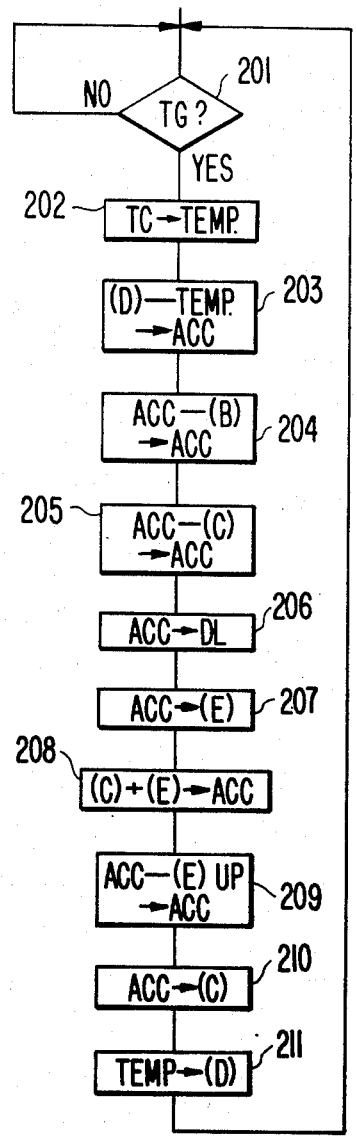
FIG. 6 is a memory map of RAM.
FIG. 7 is a flow chart for explaining operation of a timing controller.

FIG. 6 shows a memory map showing an example of an arrangement of memory cell of the RAM 7. In accordance with the state of the four bits of address selective signals j, e, g, f (these correspond to the signals appear at the output terminals 5j, 5e, 5g, 5f of FIG. 3, respectively.) which are outputted from the bus selector 28 of FIG. 1, addresses from address 701 to address 708 of area D and from address 711 to address 718 of area E or from address 721 to address 728 of area F are accessed. Further, as will be described later, the selection of area D, area E or area F is carried out by the timing controller 26 through the control bus 29. The address 710 of area B which stores the desired value (or reference value) for the speed control of the motor 1 and the address 720 of area C which stores the accumulative error, and address 730 of area G, address 731 of area H and address 732 of area I used in the computation of error compensation are directly accessed by the timing controller 26.

After the motor 1 reaches steady state, the timing controller 26 acts as a sequencer as described previously. Because it can be actualized on the hardware by multistage connection of D flip-flop or it can be easily processed by a program of microcomputer, explanation of its concrete construction is ommited. Based on the flow chart of FIG. 7 which shows the operation of the timing controller 26 when it is steady, the signal waveform diagram of FIG. 8 which shows the signal waveform of the main part of the system of FIG. 1 and the memory map of FIG. 6, the outline of the operation of the system will be described below.

Firstly, FIG. 8a is the output signal waveform diagram of the voltage controlled amplifier 3 of FIG. 1 and FIG. 8b is the output signal waveform diagram of the waveform shaper 4. This is also the signal waveform which is supplied to the input terminal 5d of the channel selector indicated in FIG. 3. FIGS. 8c, 8d, 8e are the signal waveforms appear at the output terminals 5j, 5f, 5g of the channel selector of FIG. 3, respectively. FIGS. 8f, 8h are the signal waveforms appear at the output terminals 6a, 6b of the programmable voltage source 6 of FIG. 1, respectively. FIGS. 8g, 8i are the signal waveforms appear at the output terminals of the comparators 11, 12, respectively. FIG. 8j is the signal waveform appears at the output terminal 5i of the channel selector of FIG. 3. The intermediate electric potentials of the signal waveforms of FIGS. 8a, 8f, 8h are at half of the electric potential of the voltage supply. Both of the lower-side envelope line which is indicated by dashed line in FIG. 8f, and the upper-side envelope line which is indicated by dashed line in FIG. 8h show the signal waveforms indicated in FIG. 8a.

The generation process at each block of the signal waveforms indicated in FIGS. 8a–j were already explained. Here again, the outline of the operation will be explained as a whole system.

Figure 8:
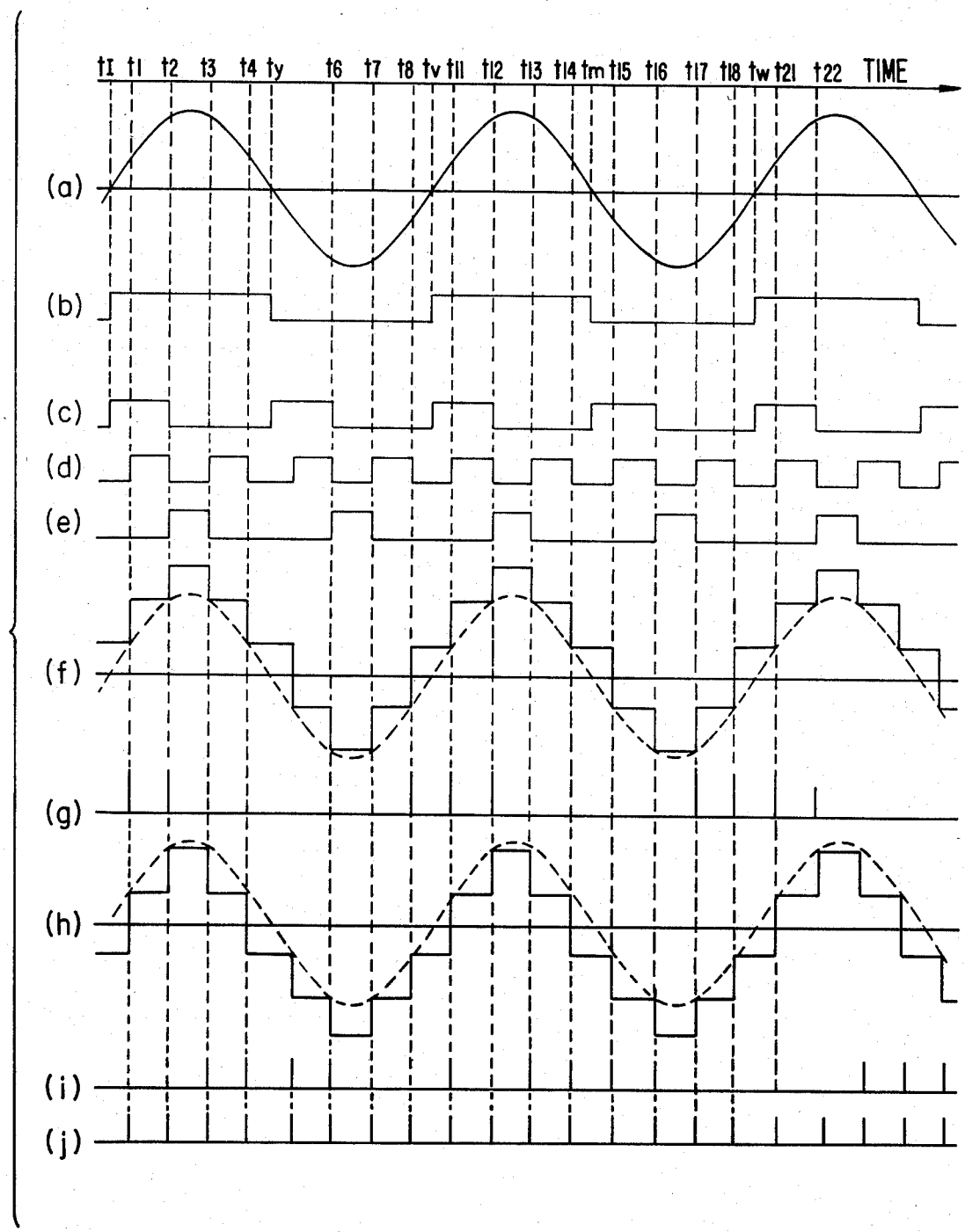
FIGS. 8a-j are signal waveform diagrams for explaining operation of the of FIG. 1.
Figure 9A:
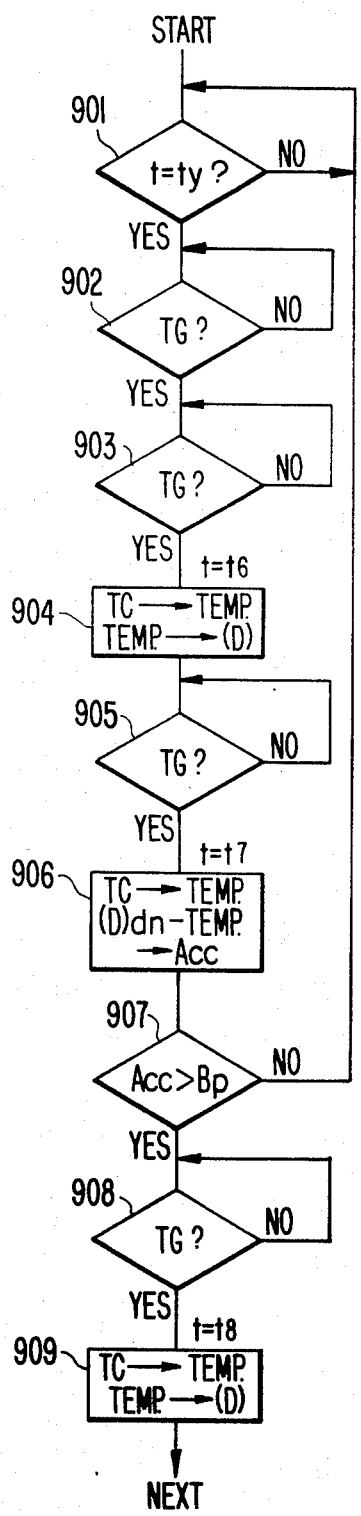
FIGS. 9a-j are flow charts for explaining error compensation by a first example of timing controller.
Figure 9B:
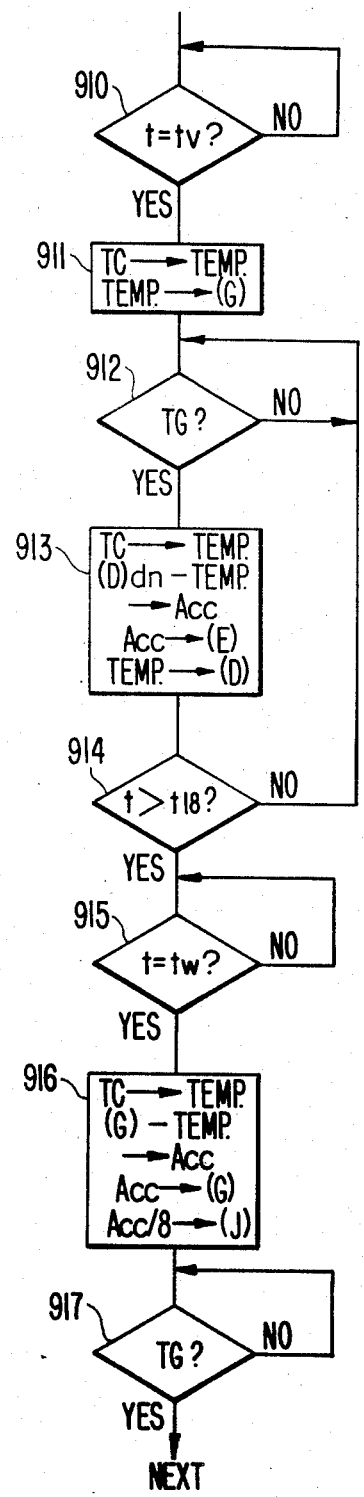
Figure 9C:
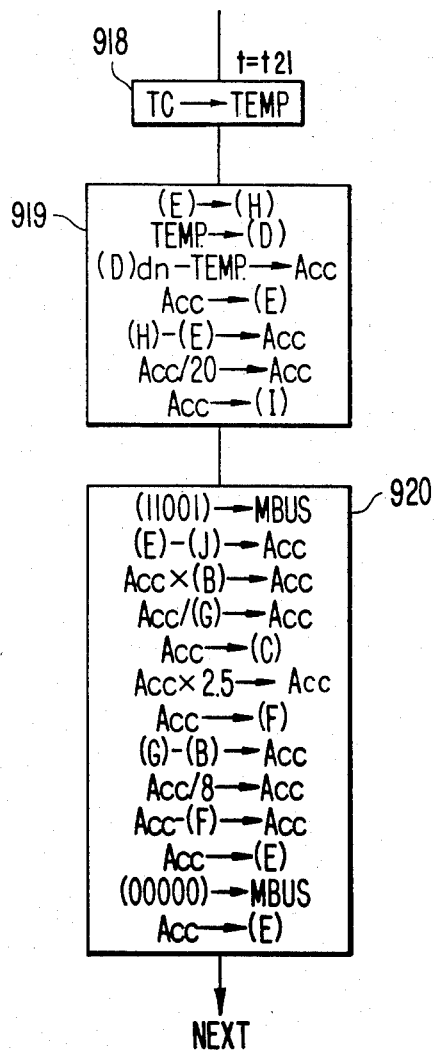
Figure 9D:
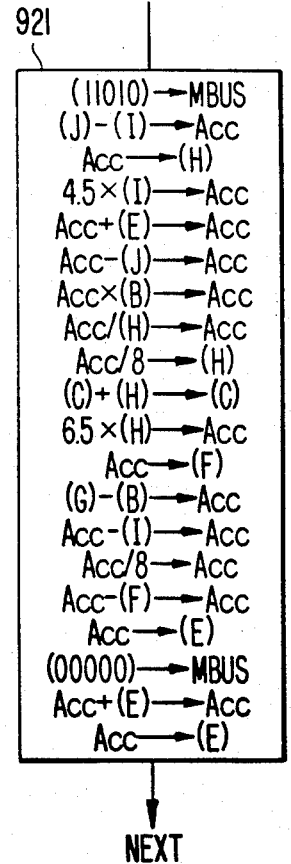
Figure 9E:
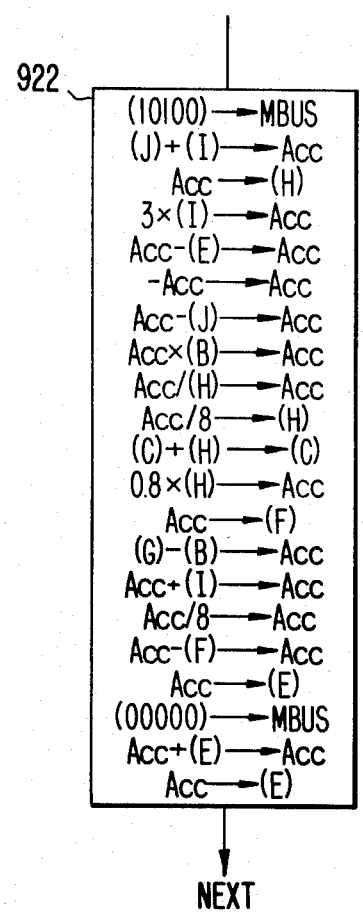
Figure 9F:
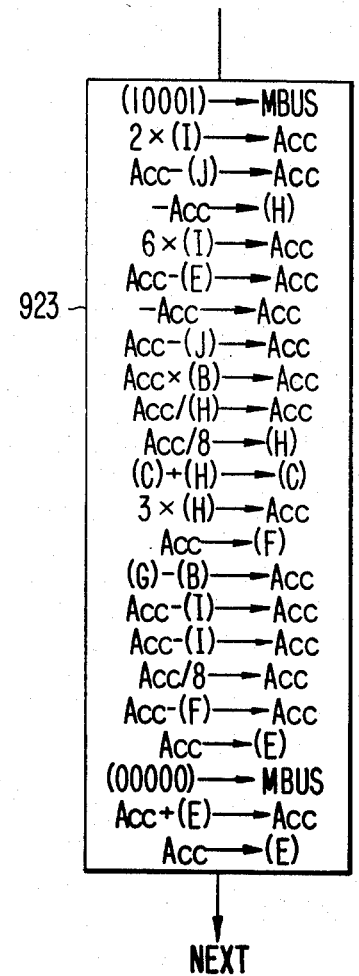
Figure 9G:
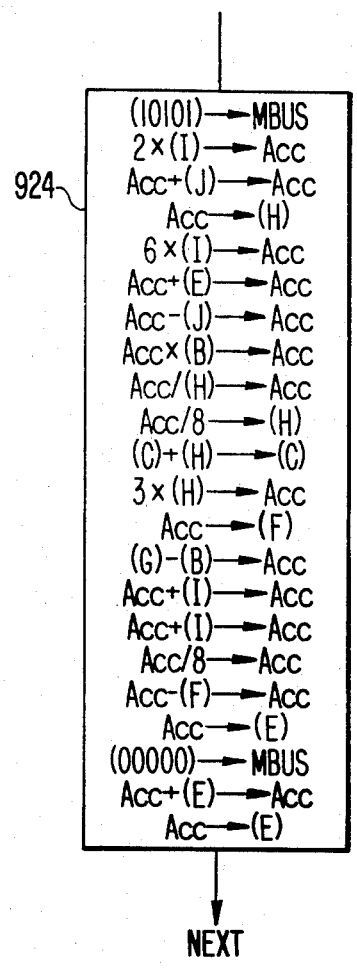
Figure 9H:
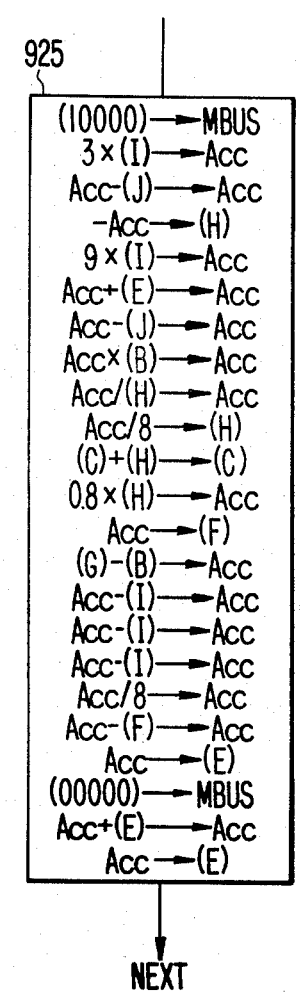
Figure 9I:
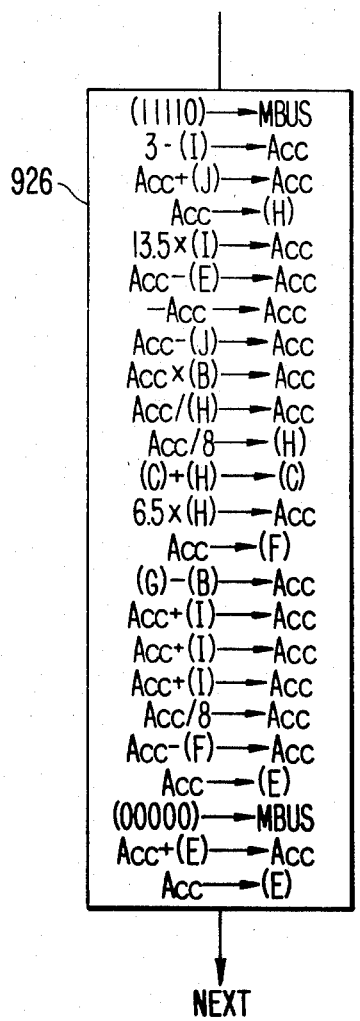
Figure 9J:
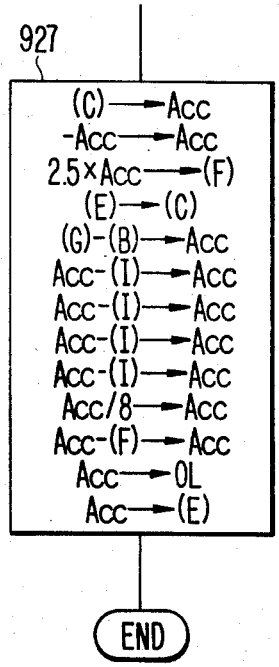

At time $t_x$ of FIG. 8, because the up-down counter 501 and the flip-flop 515 which construct the channel selector are supplied with a reset signal, the count value of the up-down counter 501 at this moment becomes [0, 0] and the level of the output terminal 5j becomes "1". At this moment, the electric potential of the output terminal 6a of the programmable voltage source 6 of FIG. 1 becomes slightly higher than the intermediate electric potential and the electric potential of the output terminal 6b becomes slightly lower. At time $t_1$, when the electric potential of output signal of voltage controlled amplifier 3 becomes higher than the electric potential of the output terminal 6a, the output level of the comparator 11 shifts to "1", and the up-down counter 501 counts up, so that the count value becomes [0, 1]. Consequently, the output level returns to "0" because the electric potentials of the output terminals a, 6b steply rise.

At time $t_2$, when the electric potential of output signal of the voltage controlled amplifier 3 becomes higher than the electric potential of the output terminal 6a again, the output level of the comparator 11 shifts to "1" again. Consequently, the count value of up-down counter 501 becomes [1, 0], and the electric potentials of the output terminals 6a, 6b also steply rise. As already explained, hereafter the acceptance of the input of up-count side is forbidden by the flip-flop 515 of FIG. 3, and now the input of down-count side becomes the holding or waiting state.

At this condition after the peak point of the output signal of the voltage controlled amplifier 3, at time $t_3$, when the electric potential becomes lower than the electric potential of the output terminal 6b, now the output level of the comparator 12 shifts to "1". The up-down counter 501 counts down and the count value becomes [0, 1], so that the electric potentials of the output terminals 6a, 6b are steply fallen.

At time $t_4$, the same operation is carried out. The up-down counter 501 counts down, so that the electric potentials of the output terminals 6a, 6b also fall. At time $t_y$, when the level of the input terminal 5d of channel selector 5 shifts to "0", so far the output signal of the comparator 12, which was the down count input of the up-down counter 501, is changed to up-count input. Until time $t_6$, each time the electric potential of the output signal of the voltage controlled amplifier 3 becomes lower than the electric potential of the output terminal 6b, the up-down counter 501 counts up and the electric potentials of the output terminals 6a, 6b steply fall further.

At time $t_7$ when the electric potential of the output signal of the voltage controlled amplifier 3 becomes higher than the electric potential of the output terminal 6a, now because the up-down counter 501 counts down the electric potentials of the output terminals 6a, 6b steply rise. Thus, because the comparators 11 and 12 generate output signals successively, at the output terminal 5i of the channel selector 5 the pulse series shown in FIG. 8j appear.

The intervals of the pulse series of FIG. 8j can remain constant by selecting the most suitable resistance value of the resistors 605–612 which fix the output voltage of the programmable voltage source shown in FIG. 5.

For example, the output signal of the speed detector 2 of FIG. 1 is assumed a sine wave. At the embodiment, because one cycle of the output signal is divided into 8 equal parts, the programmable voltage source 6 may generate two accurate output voltages. Let these voltages be $V_1$, $V_2$. Their mutual relation is given by the following equation:

$$V_n = V_p \cdot \text{Sin}(n \cdot \pi/4 - \theta) + V_c/2 \quad (1)$$

where $N = 1, 2$.

In equation (1), Vc is the voltage of the voltage supply, and Vp is the voltage of half amplitude which is controlled by the amplitude controller 9. In the embodiment the value of $\theta$ is set $\pi/8$.

Therefore, when we consider the system scale, if there is no hindrance in increasing the step precision of the output voltage of the programmable voltage source 6 to about the level of a 12-bit digital-analog converter, we can directly obtain the error voltage by comparing the interval of pulse series indicated in FIG. 8j with the reference value.

If the relative error of output voltage of the programmable voltage source 6 is 0.013% which is equivalent to ½LSB of 12-bit digital-analog converter, the deviation of the normalized pulse interval of signal waveform of FIG. 8j will be the largest at the section from time $t_2$ to time $t_3$ of FIG. 8. The value is obtained by substituting $n=2$ in equation (1), dividing the microangle difference where $\Delta V_n$ is to be equal to $1.3 \cdot 10^{-5}$ by $\pi/4$ and multiplying by 2. The value is about 0.08%. It can ensure a sufficient detection precision in usual applications.

However, in the embodiment of this invention shown in FIG. 1, the relative error of the output voltage of the programmable voltage source 6 is larger (say about 1%), it can ensure a sufficient detection precision. And yet it is so constructed to reflect fastly the information which changes from time to time to the output, as described below.

The output signal of the channel selector 5 shown in FIG. 8j is supplied to the timing controller 26 as a trigger signal. When the trigger signal is in active state, the timing controller 26 carries out the operations shown in FIG. 7. That is, at time $t_1$ of FIG. 8 the level of the trigger signal is shifting to "1". At this moment the discriminating result at branch 201 (in FIG. 7 trigger signal is indicated by the symbol TG) of FIG. 7 becomes true. The processing block 202 transfers the count value TC at that moment of the counter 15 to the temporary register 17 (indicated by the symbol TEMP in FIG. 7). Continuously, the processing block 203 carries out the subtraction of the value stored in the temporary register 17 from the value [D] stored in area D of the RAM 7, and puts the subtracted result to the accumulator (in FIG. 7, indicated by the symbol ACC) which is belonging to the ALU 19. Further, at this moment the address selection of the RAM 7 is carried out by the channel selector 5. For area D, address 701 of FIG. 6 is selected.

The processing block 204 subtracts the reference value [B] of area B of the RAM 7 from the value of the accumulator. The processing block 205 further subtracts the value [C] of area C of the RAM 7 from the previous subtraction result and the result is remaining in the accumulator. Continuously, the processing block 206 transfers the value remained in the accumulator to the latch 22 (in the flow chart of FIG. 7, indicated by OL). Further, the processing block 207 transfers the same value to the address 711 of area E of the RAM 7 (in the flow chart of FIG. 7, indicated by [E]).

The processing block 208 adds the value [C] of area C of the RAM 7 and the value (the value remained in the accumulator) of address 711 of area E of the RAM 7. The processing block 209 subtracts the value (in the flow chart of FIG. 7 indicated [E]up) of address 712 which is the next address of address 711 of area E of RAM 7 from the additional result in the processing block 208. Further, the processing block 210 stores the subtraction result in the area C of the RAM 7. Furthermore, the processing block 211 transfers the value which is stored in the temporary register 17 to the address 701 of area D of the RAM 7, and is ending a series of processes.

At time $t_2$ of FIG. 8, when the level of trigger signal which is supplied to the timing controller 26 shifted to "1", the address of the RAM 7 is incremented and exactly the same processes are carried out. After that, each time the level of trigger signal shift to "1", the processes indicated in FIG. 7 are repeated.

In the processing block 211 of FIG. 7, because the count value of the counter 15 of that moment is stored in the area D of the RAM 7, in processing blocks 202, 203 is obtained the time difference data after subtracting the present count value from the previous count value. For example, if we consider time $t_{12}$ of FIG. 8 as the present time, the count value of the counter 15 at time $t_2$ is stored in the address 702 of area D of the RAM 7. Let this value be $D_2$ and the count value at time $t_{12}$ be $D_{12}$. The operation in processing block 203 executes $D_2 - D_{12}$. Here, the counter 15 is a down-counter. And, if $D_{12} > D_2$, the operation in processing block 203 becomes $D_2 - D_{12} - 1$.

Further, in the processing block 204, the average error data from time $t_2$ to time $t_{12}$ is obtained by subtracting the reference value (a desired value for speed control, which is not indicated in FIG. 1, some kinds of data being prepared in read-only memory, etc, and transferred to suitable RAM area) which is being stored in the area B of the RAM 7.

On the other hand, the accumulative value of speed error detection value from time $t_2$ to time $t_{11}$ is stored in the area C of the RAM 7 (when a very large speed error is detected at, for example, starting of motor 1 zero is stored as accumulative value). The processing block 205 obtain the error data $E_{12}$ based on the speed changes occured in the section from time $t_{11}$ to time $t_{12}$ by executing the subtraction of the accmulative value which is stored in the area C of the RAM 7 from the average error data from time $t_2$ to time $t_{12}$. In the processing block 206, this error data $E_{12}$ is transferred to latch 22, converted to an analog voltage or current by the digital-analog converter 24, and supplied to the power amplifier 25. Therefore until the next comparison point (in this example, the processing point at time $t_{13}$), the power amplifier 25 supplies driving power which is dependent on the output of the digital-analog converter 24 to the motor 1.

Thus, the programmable voltage source 6, the comparators 11, 12, the counter 15 and the ALU 19 construct a discriminating means which generates the error output corresponding to deviation from the desired value.

On the other hand, in the processing block 207 the data error $E_{12}$ is stored in the address 712 of area E of the RAM 7. In the processing block 208 the error data $E_{12}$ is added to the accumulative value which is stored in the area C of the RAM 7. Further, the processing block 209 subtracts the error data (the error data from the section of time $t_2$ to time $t_3$ is stored) which is stored in the address 713 of area E from the additional result in the processing block 208. The processing block 210 stores the computed result in the area C. Therefore, at this moment the accumulative value of error data of the section from time $t_3$ to time $t_{12}$ is stored in the area C. At the comparison point of time $t_{13}$, the stored data is prepared for a detection of speed error of the section from time $t_{12}$ to time $t_{13}$. The processing block 211, transfers the count value $D_{12}$ which is stored in the temporary register 17 to the address 702 of area D of the RAM 7, and this is what prepared for the processes at the comparison point of time $t_{22}$.

Thus, if there is some speed change occured in between time $t_{11}$ and time $t_{12}$ of FIG. 8, the result not only reflects to the error output to the latch 22 at time $t_{12}$, but remains in the area C of the RAM 7 as a record which reflects to the error outputs at all comparison points until time $t_{21}$. For example, if we assume the output frequency of the speed detector 2 at the regulated rotational speed of the motor 1 be 48 Hz, the number of bits of the counter 15 be 16 and its clock frequency be 1 MHz, the desired value $B_0$ which is stored in the area B of the RAM 7 becomes 20833 ($10^6/48 = 20833$). If until time $t_{11}$ the computed values in the processing block 204 of FIG. 7 are almost unchanged, and there is a 10% fall of rotational speed in between time $t_{11}$ and time $t_{12}$, this result immediately appears as the error detection data at the comparison point of time $t_{12}$, and the value $E_{12}$ becomes as follows:

$$E_{12} = 20833 \cdot (7 + 1.1)/8 - 20833 \quad (2)$$

$$\approx 260$$

The motor 1 is accelerated according to the error data $E_{12}$. Consequently, if the rotational speed of the motor 1 returned to the regulated value between time $t_{12}$ and time $t_{13}$ (actually, because the mechanical time constant is large, it is impossible that the rotational speed instantaneously returns to its origin, but it is assumed so for easy understanding of the explanation), the computed result in the processing block 204 of FIG. 7 at the comparison point of time $t_{13}$ still remains 260. But, in the accumulative values of speed error from time $t_3$ to time $t_{12}$ which are stored in the area C of the RAM 7, because the record of error data from time $t_{11}$ to time $t_{12}$ is being remained, the error data which accurately reflects the changes of rotational speed of the motor 1 of the section from time $t_{12}$ to time $t_{13}$ can be obtained by executing the computation (computed result becomes zero) in the processing block 205 of FIG. 7. At the comparison after time $t_{13}$ too, the influence of the fall of the rotational speed of motor 1 of the section from time $t_{11}$ to time $t_{12}$ appears at processing block 204. But, by executing the computation at processing block 205, all of these are encountered on each other.

In the above explanation, the case in which the rotational speed of the motor 1 is at the regulated value in advance and the speed change occurs at only a specific section is explained. However, since the accumulative values of error data at each section is stored in the area C of the RAM 7, an accurate error output can be obtained without any delay even the speed changes occur from one to another at each section.

That is, at any time $t_n$, the error detection value $E_n$ from time $t_{n-1}$ becomes as follows:

$$E_n = D_{n-8} - D_n - B_0 - \sum_{k=n-7}^{n-1} E_k \quad (3)$$

In the practical example of this invention indicated in FIG. 1 and FIG. 6, $D_{n-8}$ of equation (3) is stored in the area D of the RAM 7, $D_n$ is stored in the temporary register 17, $B_0$ is stored in the area B of RAM 7, and the last term of equation (3) is stored in the area C of the RAM 7 as the accumulative value.

In the practical example shown in FIG. 1, although it is measuring the time difference of the section of one period of the output signal of the speed detector 2, it can detect the error exactly as if the repeated period of the output signal of the speed detector 2 is shortened to one-eighth of its original signal as indicated in FIG. 8j. The precision of the output voltage of the programmable voltage source 6 is even slightly lowered, but great inconvenience will not occur. For example, the output signal of the speed detector 2 is assumed a sine wave. If the voltage of the upper side output terminal 6a of the programmable voltage source 6 from time $t_{11}$ to time $t_{12}$ of FIG. 8 was lowered by only 1% relative to the maximum value from intermediate electric potential than the ideal value given by equation (1), the interval of time $t_{11}$ to time $t_{12}$ becomes narrowed by about 3%. However, considering the section of 1 cycle from time $t_{11}$ to time $t_{18}$, if the interval of the specific section is narrowed, the interval of other sections must be widen. In this example, the interval from time $t_{12}$ to time $t_{13}$ becomes widened by about 3%.

Therefore, even when the section from time $t_{11}$ to time $t_{12}$ becomes narrowed, if there is no speed change of the motor 1 in this section, the error detection values obtained in the processing blocks 202–205 of FIG. 7 also become zero. The speed changes of the motor 1 become accurately reflected to the output.

Thus, if the past records from the address 711 to the address 718 of the RAM 7 which are indicated in FIG. 6 were accurately remained, it is clear from equation (3) that essentially it can carry out a control of high resolution which is the same as increasing the frequency of the output signal of the speed detector 2. Because of this it is necessary to write down the records in the area C and area E of the RAM 7 after the motor is started until changes to the control of high resolution. At that time it is necessary to well-reflect the division precision of each 8 divided section.

For example, let $\delta_1$, $\delta_2$, $\delta_3$, $\delta_4$, $\delta_5$, $\delta_6$, $\delta_7$, and $\delta_8$ be the division error of the section from time $t_8$ to time $t_{11}$ (in the following, abbreviated as first section), the section from time $t_{11}$ to time $t_{12}$ (in the following, abbreviated as second section), the section from time $t_{12}$ to time $t_{13}$ (in the following, abbreviated as third section), the section from time $t_{13}$ to time $t_{14}$ (in the following, abbreviated as fourth section), the section from time $t_{14}$ to time $t_{15}$ (in the following, abbreviated as fifth section), the section from time $t_{15}$ to time $t_{16}$ (in the following, abbreviated as sixth section), the section from time $t_{16}$ to time $t_{17}$ (in the following, abbreviated as seventh section) and the section from time $t_{17}$ to time $t_{18}$ (in the following, abbreviated as eighth section), respectively. At the measuring time, let $T_n$ be the interval which should be originally detected when the division error does not exist and $E_n$ be the deviation from the desired value. When measuring the intervals of each section after the motor 1 is started and before the control is changed to the control of high resolution, the error $\epsilon_n$ (n=1, 2, ... 8) remained in the address 711 to the address 718 of area E of the RAM 7 becomes as follows:

$$\epsilon_n = E_n + T_n \cdot \delta_n \qquad (4)$$

Because the factor of $\delta_n$ originated in this division error cannot be totally cancelled even after changed to the control of high resolution, in the case of that value is larger than the necessitated control precision, the expected control of high resolution becomes impossible. To solve this problem, the method of making the value of $\delta_n$ itself small or shifting to the control of high resolution after understanding the size of $\delta_n$ by study function preparing the fixed offset value in RAM 7 in advance are considered. As already explained the method which makes $\delta_n$ itself small is not desirable because an analog circuit becomes high precision. The effect can be expected by the latter method. In the following, such an example will be explained.

First, the state where the rotator of the motor 1 is stopping or rotating at very low rotational speed is able to be discriminated by, for example, watching the repeated period of the signal of FIG. 8b. If it is at a rotational speed below the predetermined limited value, a discrimination flag is set, and, at the same time, zero is stored in the addresses 711 to 718 of area E and address 720 of area C of the RAM 7 of FIG. 6. The maximum error data of the positive direction is send to the latch 22. By this the motor 1 is fully accelerated. Its rotational speed is gradually increasing, and exceeds the limited value. At this time the discrimination flag is reset, and after that carried out are a series of operations in the timing controller 26 and in the ALU 19 as will be described in the following.

FIG. 9 is a flow chart showing the outline of the operations of the timing controller 26 and the ALU 19 at this time. At branch 901, it is discriminated whether the trailing edge of the output signal of the waveform shaper 4 has arrived or not, that is, whether it has arrived or not at the point of time $t_y$ of FIG. 8. If it is true, the process shifts to the processing block 902. If it is not, the process returns to the branch 901. Further, if it is made so that the discrimination at branch 901 is carried out not only on the trailing edge of the output signal of the waveform shaper 4, but also on the leading edge, in the case of the discrimination result at this time was false, the next discrimination will be carried out at time $t_y$ of FIG. 8, so that more delicate detection becomes possible. Continuously, the branch 902, 903 wait until time $t_6$ arrives. When time $t_6$ arrives the processing block 904 stores the count value TC of the counter 15 in the address 706 of area D of the RAM 7, an the branch 905 waits for the arrival of time $t_7$.

The processing block 906 transfers the count value TC of the counter 15 at time $t_7$ to the temporary register 17, and, at the same time, it carries out the subtraction of the value of the temporary register 17 from the value which is stored in the former address of the address of area D of the RAM 7 which is fixed by the channel selector 5 (in FIG. 9, indicated by [D]dn). Further, the branch 907 discriminates whether the subtractional result which is remained in the accumulator of the ALU 19 is larger than the beforehand prepared reference value Bp or not. If it is true, then the process shifts to branch 908 and if it is not, returns to the first branch 901. That is, the processes from branch 901 to branch 907 measure the interval from time $t_6$ to time $t_7$ of FIG. 8. When the value exceeds the beforehand prepared reference value Bp, the amplitude of the output signal of FIG. 8a is regarded as a value which reached the fixed value, and the process shifts to the next process. When the measured value is smaller than Bp, the same process is repeated again. Further, in this case, the amplified gain of the voltage controlled amplifier 3 is not controlled and is being maintained at the fixed value.

Now, the branch 908 waits until time $t_8$ arrives (after measured the interval from time $t_{12}$ to time $t_{13}$, if the process shifted to branch 909, the branch 909 becomes waiting for the arrival of time $t_{14}$), and then the processing block 909 stores the count value of the counter 15 in the area D of the RAM 7.

The arrival of time $t_v$ is waited at branch 910, and when time $t_v$ arrives, the processing block 911 stores the count value TC of the counter 15 at that time in the address 30 of area G of the RAM 7.

Further, the arrival of the next trigger signal is waited at branch 912, and when the trigger signal arrives the processing block 913 transfers the count value of the counter 15 to the temporary register 17. After subtracting the value of temporary register 17 from the value which is stored in the fermer address of area D of the RAM 7 which is fixed by the channel selector 5, the result is stored in the area E, and furthermore the value of the temporary register 17 is transferred to the area D. It is discriminated whether the time $t_{18}$ arrived or not at branch 914 (it can recognize the arrival of a specific time by watching the RAM address which is accessed by channel selector 5), and if it is true, then the process shifts to branch 915. If it is not the process returns to branch 912 and the same process is repeated.

Consequently, in addresses 701 to 708 of area D of the RAM 7 the count values of the counter 15 at time $t_{11}$, $t_{12}$, $t_{13}$, $t_{14}$, $t_{15}$, $t_{16}$, $t_{17}$ and $t_{18}$ are respectively stored. In addresses 711 to 718 of area E the data which are dependent on the intervals of the first section, second section, third section, fourth section, fifth section, sixth section, seventh section and eighth section are respectively stored.

The branch 915 waits until time $t_w$ arrives. When time $t_w$ arrives, the processing block 916 transfers the count value TC of the counter 15 at that time to the temporary register 17, subtracts the value of temporary register 17 from the count of time $t_v$ which is stored in the address 730 of area G of the RAM 7, and restores the result in the address 730 of the RAM 7. Furthermore the value of the accumulator is divided by 8, and stored in the address 733 of area J of the RAM 7. Therefore, in the address 733 of the RAM 7, the average speed of the motor 1 from time $t_v$ to time $t_w$, that is, the data which shows the speed of the motor 1 at the fifth section is stored.

The arrival of time $t_{21}$ is waited at branch 917. Then the processing block 918 transfers the count value TC of the counter 15 at time $t_{21}$ to the temporary register 17. Next, the processing block 919 transfers the data of address 711 of area E of the RAM 7 to the address 731 of area H, and transfers the value of the temporary register 17 to the address 701 of area D. At the same time, it subtracts the value of temporary register 17 from the value which is stored in the address 708 of area D, and then stores the result in the address 711 of area E. Further, after carried out the subtraction of the value which is stored in the address 711 of area E from the value which is stored in area H, the subtracted value is divided by the fixed value 20 and stored in the address 732 of area I.

Continuously, the processing block 920 sends out the control data of [11001] ("1" of MSB becomes the switching command of the bus selector 28, lower 4 bits are correspond to the data from the control bus 8) to the control bus 27 (in the FIG. 9c, indicated by abbreviated symbol MBUS), and sets up so that the address 715 or address 725 of the RAM 7 is to be selected. Then, it carries out the subtraction of the value which is stored in the area J from the value which is stored in the address 715 of area E of the RAM 7, multiplies the subtraction result by the value which is stored in the area B, divides the multiplied result by the value which is stored in the area G, and then stores the result in the area C. Furthermore, the block 920 increases the stored result by 2.5 times and then stores the result in the address 725 of area F. At the same time, it subtracts the value which is stored in area B from the value which is stored in the area G, divides the result by 8. Furthermore, it subtracts the value which is stored in the address 725 from the divisional result, stores the subtracted result in the address 715, sends out the control data of [00000] to the control bus 27, returns the address selection of the RAM 7 to the channel selector 5, and stores the value of the accumulator in the address 711 of area E.

The processing block 921 sends out the control data of [11010] to the control bus 27, sets up so that the address 716 or address 726 of the RAM 7 is to be selected, carries out the subtraction of the value which is stored in the area I from the value which is stored in the area J, and stores the result in the area H. Further, the processing block 921 multiplies the value which is stored in the area I by 4.5 of the fixed value, adds the value which is stored in the address 716 of area E to that result, continuously carries out the subtraction of the value which is stored in the area J, multiplies by the value which is stored in the area B, divides the multiplied result by the value which is stored in the area H, divides that value by 8, stores the result in the area H, adds the stored value to the value which is stored in the area C, restores the added result in the area C, increases the value which is stored in the area H by 6.5 times, stores the result in the address 726 of area F, at the same time, subtracts the value which is stored in the area B from the value which is stored in the area G, subtracts the value which is stored in the area I from the result, divides the result by 8, subtracts the value which is stored in the address 726, stores the result in the address 716 of area E, sends out the control data of [00000] to the control bus 27, returns the address selection of the RAM 7 to the channel selector 5, adds the value which is stored in the address 711 of area E to the value of the accumulator, and then restores the added result to the address 711.

The processing block 922 sends out the control data of [10100] to the control bus 27, sets up so that the address 714 or address 724 of the RAM 7 is to be selected, adds the value which is stored in the area I to the value which is stored in the area J, stores the result in the area H, multiplies the value which is stored in the area I by the fixed value 3, subtracts this value from the value which is stored in the address 714 of area E, continuously carried out the subtraction of the value which is stored in the area J, multiplies by the value which is stored in the area B, divides the multiplied result by the value which is stored in the area H, divides the value by 8, stores the result in the area H, adds this value to the value which is stored in the area C, restores the result in the area C, decreases the value which is stored in the area H by 0.8, stores the result in the address 724 of area F, at the same time, subtracts the value which is stored in the area B from the value which is stored in the area G, adds the value which is stored in the area I, divides that result by 8, subtracts the value which is stored in the address 724, stores in the address 714 of area E, sends out the control data of [00000] to the control bus 27, returns the address selection of the RAM 7 to the channel selector 5, adds the value which is stored in the address 711 of area E to the value of the accumulator, and then restores the added result to the address 711.

The processing block 923 sends out the control data of [10001] to the control bus 27, sets up so that the address 717 or address 727 of the RAM 7 is to be selected, increases the value which is stored in the area I by 2, carries out the subtraction of this value from the value which is stored in the area J, stores the result in the area H, multiplies the value which is stored in the area I by the fixed value 6, subtracts this value from the value which is stored in the address 717 of area E, continuously carries out the subtraction of the value which is stored in the area J, multiplies the result by the value which is stored in the area B, divides the multiplied result by the value which is stored in the area H, divides the value by 8, stores the result in the area H, adds this value to the value which is stored in the area C, restores the result in the area C, increases the value which is stored in the area H by 3, stores the result in the address 727 of area F, at the same time, executes the subtraction of the value which is stored in the area B from the value which is stored in the area G, subtract the value which is stored in the area I twice, divides that result by 8, subtracts the value which is stored in the address 727 from the divided result, stores the result in the address 717 of area E, sends out the control data of [00000] to the control bus 27, returns the address selection of the RAM 7 to the channel selector 5, adds the value which is stored in the address 711 of area E to the value of the accumulator, and then restores the added result to the address 711.

The processing block 924 sends out the control data of [10101] to the control bus 27, setsup so that the address 713 or address 723 of the RAM 7 is to be selected, increases the value which is stored in the area I by 2, adds this value to the value which is stored in the area J, stores the result in the area H, multiplies the value which is stored in the area I by the fixed value 6, adds the result which is stored in the address 713 of area E to that result, continuously carries out the subtraction of the value which is stored in the area J, multiplies the result by the value which is stored in the area B, divides the multiplication result by the value which is stored in the area H, divides the value by 8, stores the result in the area H, adds this value to the value which is stored in the area C, restores the result in the area C, increases the value which is stored in the area H by 3, stores the result in the address 723 of area F, at the same time, executes the subtraction of the value which is stored in the area B from the value which is stored in the area G, adds the value which is stored in the area I twice, divides that result by 8, subtracts the value which is stored in the address 723 from the divisional result, stores the result in the address 713 of area E, sends out the control data of [00000] to the control bus 27, returns the address selection of the RAM 7 to the channel selector 5, adds the value which is stored in the address 711 of area E to the value of the accumulator, and then restores the additional result to the address 711.

The processing block 925 sends out the control data of [10000] to the control bus 27, sets up so that the address 718 or address 728 of the RAM 7 is to be selected, increases the value which is stored in the area I by 3, carries out the subtraction of this value from the value which is stored in the area J, stores the result in the area H, multiplies the value which is stored in the area I by the fixed value 9, adds the result which is stored in the address 718 of area E to that result, continuously carries out the subtraction of the value which is stored in the area J, multiplies the result by the value which is stored in the area B, divides the multiplied result by the value which is stored in the area H, divides the value by 8, stores the result in the area H, adds this value to the value which is stored in the area C, restores the result in the area C, decreases the value which is stored in the area H by 0.8, stores the result in the address 728 of area F, at the same time, executes the subtraction of the value which is stored in the area B from the value which is stored in the area G, subtracts the value which is stored in the area I 3 times, divides that result by 8, subtracts the value which is stored in the address 728 from the divided result, stores the result in the address 718 of area E, sends out the control data of [00000] to the control bus 27, returns the address selection of the RAM 7 to the channel selector 5, adds the value which is stored in the address 711 of area E to the value of the accumulator, and then restores the added result to the address 711.

The processing block 926 sends out the control data of [11110] to the control bus 27, sets up so that the address 712 or address 722 of the RAM 7 is to be selected, increases the value which is stored in the area I by 3, adds this value to the value which is stored in the area J, stores the result in the area H, multiplies the value which is stored in the area I by the fixed value 13.5, subtracts this value from the value which is stored in the address 712 of area E, carries out the subtraction of the value which is stored in the area J, multiplies the result by the value which is stored in the area B, divides the multiplied result by the value which is stored in the area H, divides the value by 8, stores the result in the area H, adds this value to the value which is stored in the area C, restores the result in the area C, increases the value which is stored in the area H by 6.5, stores the result in the address 722 of area F, at the same time, subtracts the value which is stored in the area B from the value which is stored in the area G, adds the value which is stored in the area I 3 times, divides that result by 8, subtracts the value which is stored in the address 722 from the divided result, stores the result in the address 712 of area E, sends out the control data of [00000] to the control bus 27, returns the address selection of the RAM 7 to the channel selector 5, adds the value which is stored in the address 711 of area E to the value of the accumulator, and then restores the added result to the address 711.

The processing block 927 inverts the sign of the value which is stored in the area C of the RAM 7, multiplies the result by the fixed value 2.5, stores the result in the address 721, transfers the value which is stored in the address 711 of E area of the RAM 7 to the area C, subtracts the value which is stored in the area B from the value which is stored in the area G, increases the value which is stored in the area I by 4, subtracts this, makes that result into one-eighth, subtracts the value which is stored in the address 721, transfers the result to the latch 22, and stores it in the address 711 of area E.

At this time it means that the first step of study operation for shifting to the control of high resolution ended. In the following the meaning of a series of processes from processing block 918 to processing block 927 will be explained.

Firstly, as a precondition for shifting from branch 907 to processing block 908, it is discriminated whether the interval of the third section or the seven section approached the fixed value or not. So, the compensation precision is improved on the study operation at the state, because the state is a more similar to the state where the amplitude control was performed by the voltage controlled amplitude. In the case of compensating after detecting the division error in the accelerated period of the motor 1, due to the rotational speed which changes from time to time, the amplitude of signal waveform of FIG. 8a itself also changes, and moreover the degrees of the interval change at each section towards the amplitude changes also differ from each other.

Figure 10:
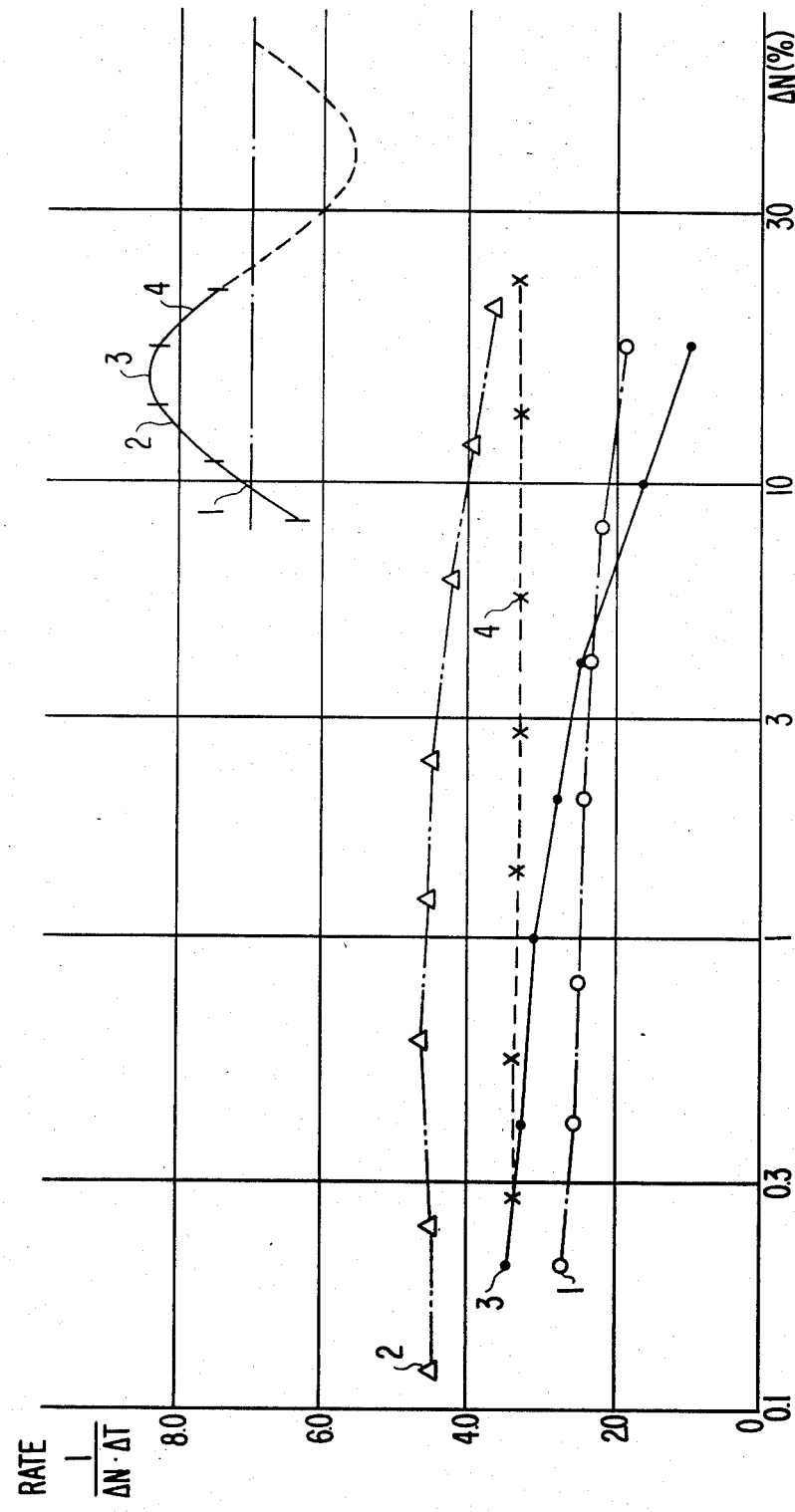
FIG. 10 and FIG. 11 are characteristic diagrams showing changing characteristic of intervals with respect to speed changes in each divided section in the first example.

When the rotational speed of the motor 1 has been increased by constant acceleration from time $t_8$ in FIG. 8, FIG. 10 is obtained by taking the amount of speed change per the changing ratio of the reciprocal of the interval of the first section, second section, third section and fourth section, respectively. The axis of abscissa is the amount of speed changing, and the axis of ordinate is the changing ratio of the reciprocal of the interval. Its calculation is based on the following equation:

$$Vn = N \cdot Vp \cdot Sin(2 \cdot \pi \cdot a \cdot N \cdot t + \pi/8) \qquad (5)$$

where $$N = 1 + k \cdot t \qquad (6)$$

In equation (5), t indicates time, $\alpha$ is the coefficient which fixes the output signal frequency of the speed detector 2, k of equation (6) is the rate of speed increase of the motor 1, that is the coefficient which determines the size of the axis of abscissa of FIG. 10, and the other coefficients correspond to equation (1). In the third section the value of $1/(\Delta N) \cdot (\Delta T)$ becomes a negative number (because of the influence of the increase of amplitude is very large) but it is plotted in the same quadrant.

From FIG. 10, the changing ratios at each section differ greatly, but if we consider the rotational speed of the motor 1 changes in few-tenth percents in one-eighth period of the output signal of the speed detector 2 is impossible, in the same section, we know that the speed increasing ratio does not change very much in the limit of practical use. In the flow chart shown in FIG. 9, this feature is used to increase the compensation precision. That is, the processes in the processing block 920 obtain the amount of the division error offset of the fifth section $O_5$ and the speed error of the period conversion at the fifth section $E_5$ which are expressed by the following equations:

$$O_5 = 2.5 \cdot (X_5 - D_z/8) \cdot B_0/D_z \tag{7}$$

$$E_5 = (D_z - B_0)/8 - O_5 \tag{8}$$

Here, $X_5$ is the value measured from the interval of the fifth section from time $t_{14}$ to time $t_{15}$, $D_z$, $B_0$ are the average speed information which is stored in the area G of the RAM 7 and the desired value which is stored in the area B of the RAM 7 respectively, and $D_z/8$ is stored in the area J of the RAM 7.

In the equation (7), when the division error does not exist in the fifth section, $D_z/8$ is the value which should be measured. The second term of the right-hand side of equation (4) is obtained by subtracting the value $D_z/8$ from the actually measured value. But, since this value is the division of the value of the interval in proportion to the rotational speed, if the rotational speed changes, the value corresponding with the division error also changes. Further, the division error component is obtained by multiplying the ratio of $B_0/D_z$ which is converted from the period when the rotational speed of the motor 1 is at the neighborhood of the fixed value. $B_0$ is the desired value of rotational speed, and $D_z$ is the rotational speed at the measuring time.

The multiplying of 2.5 at the beginning of equation (7) carries out the compensation of the rate of change of interval of each section after shifted to high resolution control. The calculation of the rate of change is based on the following equation:

$$Vn = N \cdot Vp \cdot Sin(2 \cdot \pi \cdot a \cdot N \cdot t + n \cdot \pi/8) \tag{9}$$

Where, n = 1, 2, 3, 4.

Figure 11:
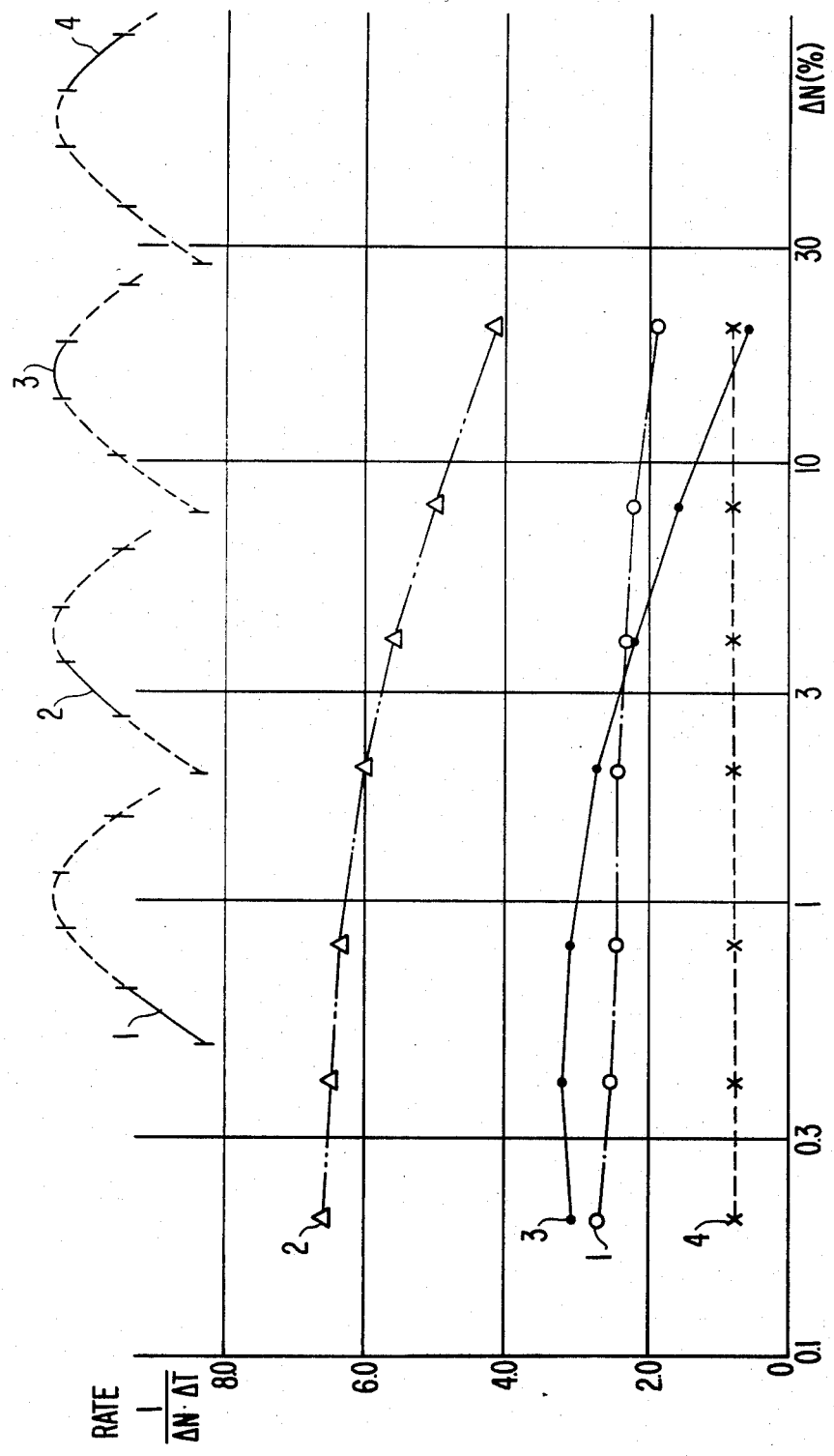

FIG. 11 shows the rate of change at each section when started from the first to the fourth section at the same outline as FIG. 10. In the limit of practical use the values of the rate of change at the first section, second section, third section and fourth section are 2.5, 6.5, 3.0 and 0.8, respectively. Further, the values from the fifth section to the eighth section are the same value as those from the first section to the fourth section.

Figure 12A:
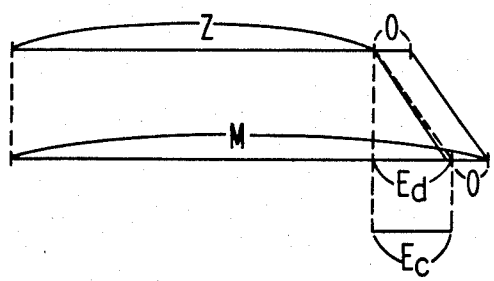
FIGS. 12a-b show a relation between measuring interval values and error values.

FIG. 12a shows the relation of the value of measuring section, the value of offset and the value of the error, when the rotational speed of the motor 1 became slower than the fixed speed. Let the measured value be M, the fixed value be Z (Z<M), the value of offset be O, the computed error value be Ec and the original value be Ed, then the computed error value Ec and the original error value Ed are expressed by the following equations:

$$Ec = M - Z - O \tag{10}$$

$$Ed = M - Z - O \cdot M/Z \tag{11}$$

That is, the computed error value becomes greater than the original error value by only $(1-M/Z) \cdot O$. Error value is outputted in order to make the rotational speed of the motor 1 higher than the original error value Ed. Therefore, the rotational speed of the motor 1 can approach the fixed speed quickly. And, because there are no multiplications and divisions in the calculation, the calculation can be executed faster, and the construction also becomes simple.

Figure 12B:
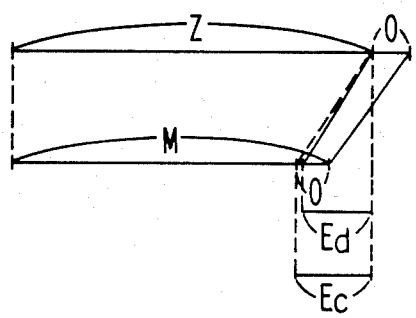
Figure 13A:
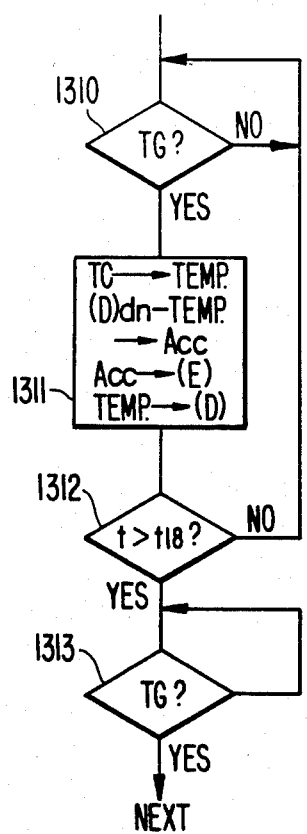
FIGS. 13a-i are flow charts for explaining error compensation by a second example of timing controller.
Figure 13B:
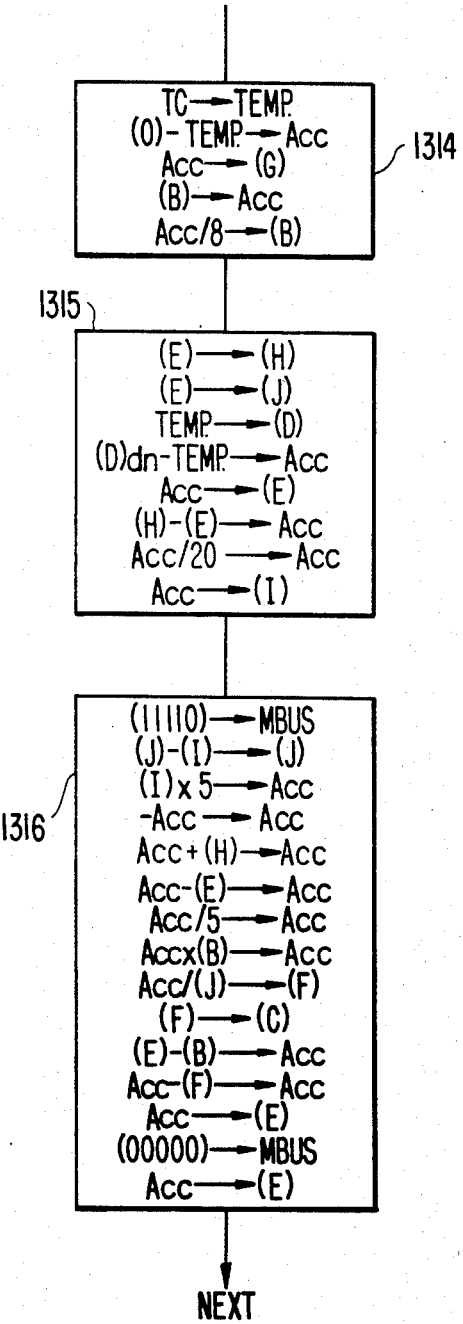
Figure 13C:
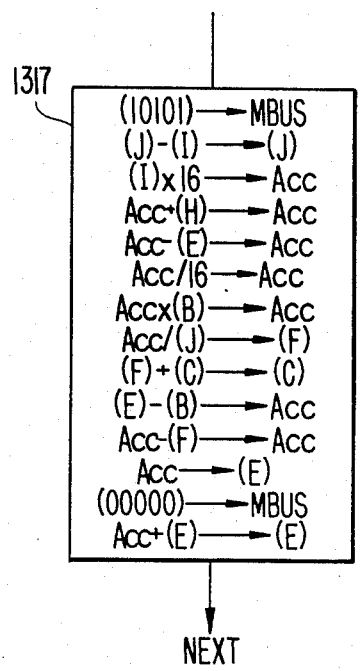
Figure 13E:
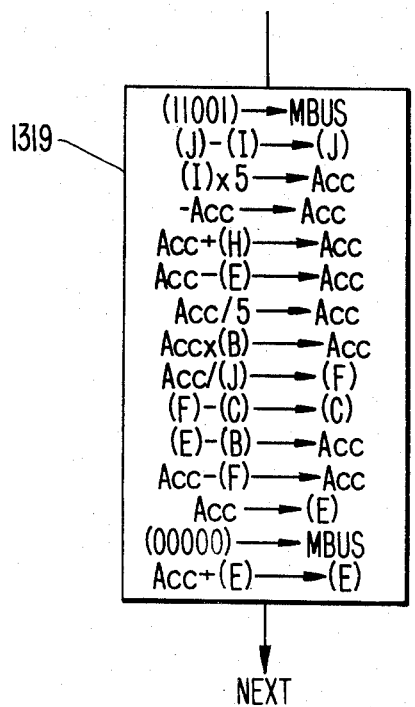
Figure 13D:
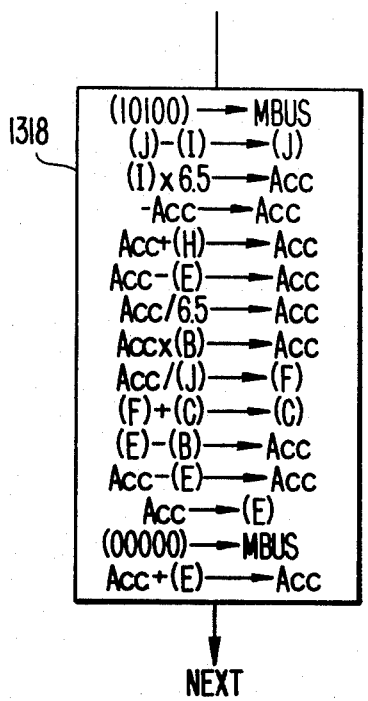
Figure 13F:
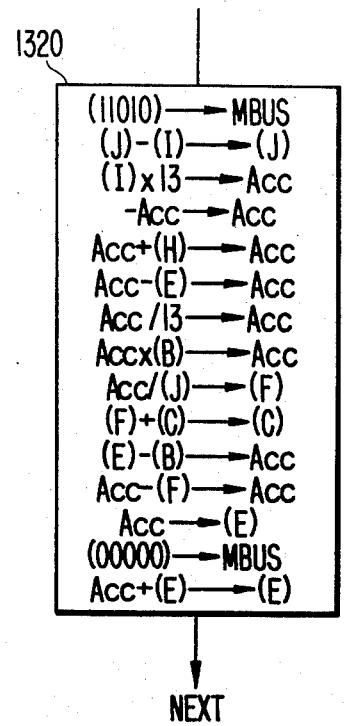
Figure 13G:
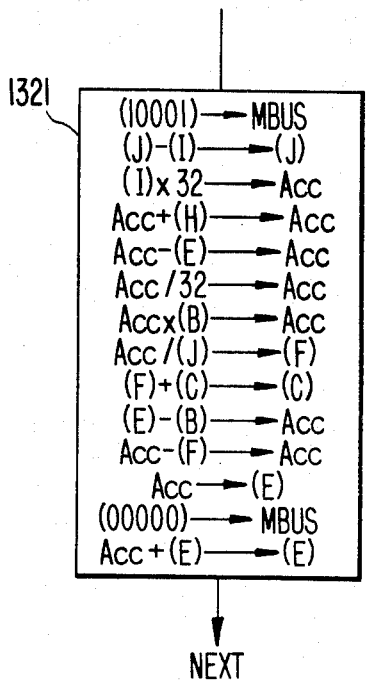
Figure 13H:
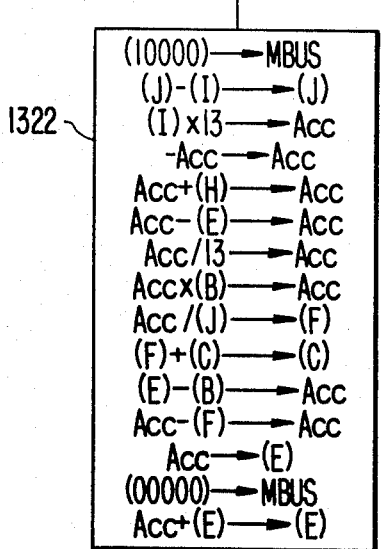
Figure 13I:
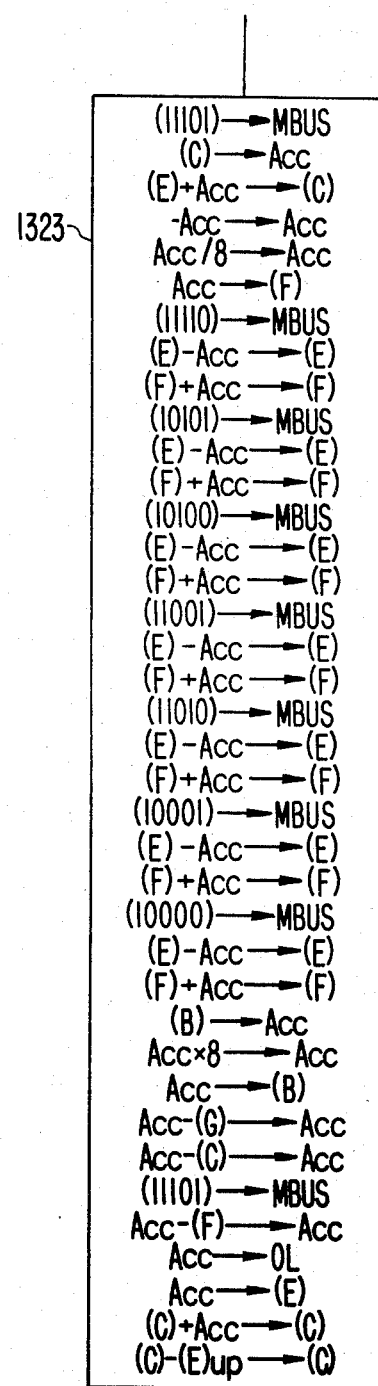

Same as FIG. 12a, FIG. 12b shows the relation of the value of measuring section, the value of offset and the value of the error, when the rotational speed of the motor 1 became faster than the fixed speed (Z>M). The computed error value Ec and the original error value Ed are expressed by the equations (10), (11). That is, the computed error value Ec becomes smaller than the original error value Ed by only $(1-M/Z) \cdot O$. The error value is outputted in order to make the rotational speed of the motor 1 lower than the original error value Ed. Therefore, the rotational speed of the motor 1 can approach the fixed speed quickly.

Next, the processes in the processing block 921 are obtaining the amount of division error offset of the sixth section $O_6$ and the speed error of period conversion at the sixth section $E_6$ which are expressed by the following equations:

$$O_6 = 6.5 \cdot (X_6 + 4.5 \cdot A - D_z/8) \cdot B_0/\{8 \cdot (D_z/8 - A)\} \tag{12}$$

$$E_6 = D_z/8 - A - B_0/8 - O_6 \tag{13}$$

In equations (12), (13), A is the value which is stored in the area I of the RAM 7. Let $X_1$ be the interval of the first section from time $t_8$ to time $t_{11}$ and $X_{11}$ be the interval of the first section from time $t_{18}$ to time $t_{21}$, then A is expressed by the following equation:

$$A = (X_1 - X_{11})/(8 \cdot 2.5) \tag{14}$$

That is, A indicates the amount of speed change at each section, 2.5 of the denominator of equation (14) is the rate of change of the first section obtained from FIG. 10.

In equation (12), the second term is the value of division error which is obtained from the rotational speed of measuring time of the motor 1 and the amount of speed change A of each section. The division error of the section 6 is obtained by multiplying the division error by the ratio of the desired value of rotational speed B0 to $\{8 \cdot (D_z/8 - A)\}$ which indicates the rotational speed of the measuring time when the rotational speed of the motor 1 is at neighborhood of the fixed value. The fixed values 6.5 and 4.5 of equation (12) are the rates of change of the sixth section which are obtained from FIG. 11 and FIG. 10, respectively.

On the other hand, the processes in the processing block 922 are obtaining the amount of division error offset of the fourth section $O_4$ and the speed error of period conversion at the fourth section $E_4$ which are expressed by the following equations:

$$O_4 = 0.8 \cdot (X_4 - 3 \cdot A - D_z/8) \cdot B_0/\{8 \cdot (D_z/8 + A)\} \tag{15}$$

$$E_4 = D_z/8 + A - B_0/8 - O_4 \tag{16}$$

The fixed values 0.8 and 3 of equation (15) are the rates of change of the fourth section which are obtained from FIG. 11 and FIG. 10, respectively.

Further, the processes in the processing block 923 are obtaining the amount of division error offset of the seventh section $O_7$ and the speed error of period conversion at the seventh section $E_7$ which are expressed by the following equations:

$$O_7 = 3 \cdot (X_7 - 3 \cdot 2 \cdot A - D_z/8) \cdot B_0 / \{8 \cdot (D_z/8 - 2 \cdot A)\} \quad (17)$$

$$E_7 = D_z/8 - 2 \cdot A - B_0/8 - O_7 \quad (18)$$

In the equation (17), although the rotational speed in the seventh section is increasing more than in the fifth section, the executing of $(X_7 - 3 \cdot 2 \cdot A)$ as explained previously is based on the reason that the polarities of the rate of change at the seven section and the third section are becoming opposite to other sections.

Similarly, the processes in the processing block 924 are obtaining the amount of division error offset of the third section $O_3$ and the speed error of period conversion at the third section $E_3$ which are expressed by the following equations:

$$O_3 = 3 \cdot (X_3 + 3 \cdot 2 \cdot A - D_z/8) \cdot B_0 / \{8 \cdot (D_z/8 + 2 \cdot A)\} \quad (19)$$

$$E_3 = D_z/8 + 2 \cdot A - B_0/8 - O_3 \quad (20)$$

The processes in the processing block 925 are obtaining the amount of division error offset of the eighth section $O_8$ and the speed error of period conversion at the eighth section $E_8$ which are expressed by the following equations:

$$O_8 = 0.8 \cdot (X_8 + 3 \cdot 3 \cdot A - D_z/8) \cdot B_0 / \{8 \cdot (D_z/8 - 3 \cdot A)\} \quad (21)$$

$$E_8 = D_z/8 - 3 \cdot A - B_0/8 - O_8 \quad (22)$$

The processes in the processing block 926 are obtaining the amount of division error offset of the second section $O_2$ and the speed error of period conversion at the second section $E_2$ which are expressed by the following equations:

$$O_2 = 6.5 \cdot (X_2 - 4.5 \cdot 3 \cdot A - D_z/8) \cdot B_0 / \{8 \cdot (D_z/8 + 3 \cdot A)\} \quad (23)$$

$$E_2 = D_z/8 + 3 \cdot A - B_0/8 - O_2 \quad (24)$$

Further, the processes in the processing block 927 are obtaining the amount of division error offset of the first section $O_1$ and the speed error of period conversion at the first section $E_1$ which are expressed by the following equations:

$$O_1 = -(O_2/6.5 + O_3/3 + O_4/0.8 + O_5/2.5 + O_6/6.5 + O_7/3 + O_8/0.8) \quad (25)$$

$$E_1 = D_z/8 - 4 \cdot A - B_0/8 - O_1 \quad (26)$$

The right-hand side of equation (25) is what inverted the sign of the total of normalized division error components from the second section to the eighth section which are stored in the area C of the RAM 7. This calculation is based on the following equation:

$$\sum_{k=1}^{8} \delta_k = 0 \quad (27)$$

The equations (17), (19), (21) and (23) are for obtaining the division error component when the rotational speed is at the neighborhood of the fixed value, as the same method as equation (12).

In equations (8), (13), (16), (18), (20), (22), (24) and (26), the processes subtract the amount of offsets at the fifth, the sixth, the fourth, the seventh, the third, the eighth, the second, the first sections $O_5$, $O_6$, $O_4$, $O_7$, $O_3$, $O_8$, $O_2$ and $O_1$ from the error at that time, but if this operation carries out only once until it shifts to the control of high resolution, after that because usually the amount of the offsets of $O_1$-$O_8$ only are remained in the address 711 to address 718 of area E of the RAM 7, the process may shift to the control operations as indicated in the flow chart of FIG. 7.

Thus, in this embodiment, until it shifts to the control of high resolution the timing controller 26 makes the RAM and the ALU compute the deviation from the normal time, which equally divides the AC signal waveform of the speed detector 2, and the generating time of the output signals of the comparators 11, 12 which are outputted through the channel selector 5 in one period of the output signal of the speed detector 2. By adding that computed result as the offset value to area E which stored the record of the speed error of the RAM 7, better precision control becomes possible.

Below, the second embodiment of this invention will be described with reference to FIG. 13. Since the circuit construction (hardware) of the second embodiment are the same as the first embodiment and the difference is only the compensational method, we ommit the explanation of the circuit construction. Further, since the first part of the flow chart of the error compensation is the same as the flow chart of FIG. 9a in the first embodiment, we ommit explanation of this. So, the flow chart continues from the block 909 of FIG. 9a.

Referring to FIG. 13, the arrival of the next trigger signal is waited at branch 1310. When the trigger signal arrives, the processing block 1311 transfers the count value TC of the counter 15 to the temporary register 17, subtracts the value of the temporary register 17 from the value which is stored in the former address of area D of the RAM 7 which is fixed by the channel selector 5, stores the result in the area E, and transfers the value of the temporary register 17 to the area D. It is discriminated whether the time $t_{18}$ arrived or not at branch 1312. If it is true, the process shifts to branch 1313, and if it is not, the process returns to branch 1310 and repeats the same processes.

Consequently, in address 701 to address 708 of area D of the RAM 7 the count values of the counter 15 at time $t_{11}$, $t_{12}$, $t_{13}$, $t_{14}$, $t_{15}$, $t_{16}$, $t_{17}$ and $t_{18}$ are respectively stored. In address 711 to address 718 of area E the data which are dependent on the time intervals of the first section, second section, third section, fourth section, fifth section, sixth section, seventh section and eighth section are respectively stored.

The arrival of time $t_{21}$ is waited at branch 1313. Continuously the processing block 1314 transfers the count value TC of the counter 15 at time $t_{21}$ to the temporary register 17, subtracts the value of the temporary register 17 from the count value of time $t_{11}$ which is stored in the address 711 of area D of the RAM 7, transfers the data of address 710 of the RAM 7 to the accumulator, and stores the data which is divided by 8 in the address 710 of the RAM 7 again.

Next, the processing block 1315 transfers the data of address 711 of area E of the RAM 7 to the address 731 of area H and to the address 733 of area J transfers the value of the temporary register 17 to the address 701 of area D, subtracts the value of the temporary register 17 from the value which is stored in the address 708 of area D, stores the result in the address 711 of area E, subtracts the value which is stored in the address 711 of area E from the value of area H, divides the result by the fixed value 16, and stores the result in the address 732 of area I.

Continuously, the processing block 1316 sends out the control data [11110] to the control bus 27, sets up so that the address 712 or address 722 of the RAM 7 is to be selected, subtracts the value of address 732 of area I of the RAM 7 from the value which is stored in address 733 of area J of the RAM 7, stores the result in the address 733 of area J of the RAM 7 again, increases the value of address 732 of area I of the RAM 7 by 5 times, subtracts that value from the value which is stored in the address 731 of area H of the RAM 7, subtracts the value of address 712 of area E from that value, divides that result by 5, multiplies the value of address 710 of area B to this result, divides that multiplicational result by the value of address 733 of area J of the RAM 7, stores the value in the address 725 of area F, at the same time, stores the value in the address 720 of area C of the RAM 7, stores the value which subtracted the value of address 710 of area B and the value of address 722 of area F from the value of address 712 of area E of the RAM 7, sends out the control data [00000] to the control bus 27, returns the address selection of the RAM 7 to the channel selector 5, and stores the value of the accumulator in the address 711 of area E.

The processing block 1317 sends out the control data [10101] to the control bus 27, sets up so that the address 713 or address 723 of the RAM 7 is to be selected, carries out subtraction of the value which is stored in the area I from the value which is stored in the area J, stores the result in the area J, multiplies the value which is stored in the area I by the fixed value 16, subtracts that value from the value which is stored in the address 731 of area H, subtracts the value of address 713 of area E from that value, divides that value by the fixed value 16, multiplies that value by the value which is stored in the area B, divides the multiplicational result by the value which is stored in area J, stores that value in area F, adds this value to the value which is stored in the area C, restores the result in the area C, subtracts the value of area B from the value of the address 713 of area E, subtracts the value of address 723 of area F from that value, stores the result in the address 713 of area E, sends out the control data [00000] to the control bus 27, returns the address selection of the RAM 7 to the channel selector 5, adds the value which is stored in the address 711 of area E to the value of the accumulator, and then restores the added result to the address 711.

The processing block 1318 sends out the control data [10100] to the control bus 27, sets up so that the address 714 or address 724 of the RAM 7 is to be selected, subtracts the value which is stored in the area I from the the value which is stored in the area J, restores the result in the area J, multiplies the value which is stored in the area I by the fixed value 6.5, subtracts that value from the value which is stored in the address 731 of area H, subtracts the value of address 714 of area E from that value, divides that value by the fixed value 6.5, multiplies that value by the value which is stored in the area B, divides the multiplicational result by the value which is stoted in area J, stores that value in the address 724 of area F, adds this value to the value which is stored in the area C, restores the result in the area C, subtracts the value of area B from the value of the address 714 of area E, subtracts the value of 724 of area F from that value, stores the result in the address 714 of area E, sends out the control data [00000] to the control bus 27, returns the address selection of the RAM 7 to the channel selector 5, adds the value which is stored in the address 711 of area E to the value of the accumulator, and then restores the added result to the address 711.

The processing block 1319 sends out the control data [11001] to the control bus 27, sets up so that the address 715 or address 725 of the RAM 7 is to be selected, subtracts the value which is stored in the area I from the value which is stored in the area J, restores the result in the area J, multiplies the value which is stored in the area I by the fixed value 5, subtracts that value from the value which is stored in the address 731 of area H, subtracts the value of address 715 of area E from that value, divides that value by the fixed value 5, multiplies that value by the value which is stored in the area B, divides the multiplicational result by the value which is stored in area J, stores that value in the address 725 of area F, adds this value to the value which is stored in the area C, restores the result in the area C, subtracts the value of area B from the value of the address 715 of area E, subtracts the value of area F from that value, stores the result in the address 715 of area E, sends out the control data [00000] to the control bus 27, returns the address selection of the RAM 7 to the channel selector 5, adds the value which is stored in the address 711 of area E to the value of the accumulator, and then restores the added result to the address 711.

The processing block 1320 sends out the control data [11010] to the control bus 27, sets up so that the address 716 or address 726 of the RAM 7 is to be selected, subtracts the value which is stored in the area I from the value which is stored in the area J, restores the result in the area J, multiplies the value which is stored in the area I by the fixed value 13, subtracts that value from the value which is stored in the address 731 of area H, subtracts the value of address 716 of area E from that value, divides that value by the fixed value 13, multiplies that value by the value which is stored in the area B, divides the multiplicational result by the value which is stored in area J, stores that value in the address 726 of area F, adds this value to the value which is stored in the area C, restores the result in the area C, subtracts the value of area B from the value of the address 716 of area E, subtracts the value of area F from that value, stores the result in the address 716 of area E, sends out the control data [00000] to the control bus 27, returns the address selection of the RAM 7 to the channel selector 5, adds the value which is stored in the address 711 of area E to the value of the accumulator, and then restores the added result to the address 711.

The processing block 1321 sends out the control data [10001] to the control bus 27, sets up so that the address 717 or address 727 of the RAM 7 is to be selected, subtracts the value which is stored in the area I from the value which is stored in the area J, restores the result in the area J, multiplies the value which is stored in the area I by the fixed value 32, subtracts that value from the value which is stored in the address 731 of area H, subtracts the value of address 717 of area E from that value, divides that value by the fixed value 32, multiplies that value by the value which is stored in the area B, divides the multiplicational result by the value which is stored in area J, stores that value in the address 727 of area F, adds this value to the value which is stored in the area C, restores the result in the area C, subtracts the value of area B from the value of the address 717 of area E, subtracts the value of area F from that value, stores the result in the address 717 of area E, sends out the control data [00000] to the control bus 27, returns the address selection of the RAM 7 to the channel selector 5, adds the value which is stored in the address 711 of area E to the value of the accumulator, and then restores the added result to the address 711.

The processing block 1322 sends out the control data [10100] to the control bus 27, sets up so that the address 718 or address 728 of the RAM 7 is to be selected, subtracts the value which is stored in the area I from the value which is stored in the area J, restores the result in the area J, multiplies the value which is stored in the area I by the fixed value 13, subtracts that value from the value which is stored in the address 731 of area H, subtracts the value of address 718 of area E from that value, divides that value by the fixed value 13, multiplies that value by the value which is stored in the area B, divides the multiplicational result by the value which is stored in area J, stores that value in the address 728 of area F, adds this value to the value which is stored in the area C, restores the result in the area C, subtracts the value of area B from the value of the address 718 of area E, subtracts the value of area F from that value, stores the result in the address 718 of area E, sends out the control data [00000] to the control bus 27, returns the address selection of the RAM 7 to the channel selector 5, adds the value which is stored in the address 711 of area E to the value of the accumulator, and then restores the additional result to the address 711.

The processing block 1323 adds the the value of area E to the value of area C, divides the value which inverted the sign of that value by 8 and stores in address 721 of area F, sends out the control data [11110] to the control bus 27, sets up so that the address 712 or address 722 of the RAM 7 is to be selected, subtracts the value of the accumulator from the value of area E, stores the result in area E again, adds the value of the accumulator to the value of area F, restores the result in area F, sends out the control data [10101] to the control bus 27, sets up so that the address 713 or address 723 of the RAM 7 is to be selected, subtracts the value of the accumulator from the value of area E, stores the result in area E again, adds the value of the accumulator to the value of area F, restores the result in area F, sends out the control data [10100] to the control bus 27, sets up so that the address 714 or address 724 of the RAM 7 is to be selected, subtracts the value of the accumulator from the value of area E, stores the result in area E again, adds the value of the accumulator to the value of area F, restores the result in area F, sends out the control data [11001] to the control bus 27, sets up so that the address 715 or address 725 of the RAM 7 is to be selected, subtracts the value of the accumulator from the value of area E, stores the result in area E again, adds the value of the accumulator to the value of area F, restores the result in area F, sends out the control data [11010] to the control bus 27, sets up so that the address 716 or address 726 of the RAM 7 is to be selected, subtracts the value of the accumulator from the value of area E, stores the result in area E again, adds the value of the accumulator to the value of area F, restores the result in area F, sends out the control data [10001] to the control bus 27, sets up so that the address 717 or address 727 of the RAM 7 is to be selected, subtracts the value of the accumulator from the value of area E, stores the result in area E again, adds the value of the accumulator to the value of area F, restores the result in area F, sends out the control data [10000] to the control bus 27, sets up so that the address 718 or address 728 of the RAM 7 is to be selected, subtracts the value of the accumulator from the value of area E, stores the result in area E again, adds the value of the accumulator to the value of area F, restores the result in area F, increases the value of area B by 8 times, stores that result in area B again, at the same time, subtracts the value of area G from that result, subtracts the value of area C, sends out the control data [11101] to the control bus 27, sets up so that the address 711 or address 721 of the RAM 7 is to be selected, subtracts the value of area F from the value of the accumulator, transfers the result to the latch 22, stores in the address 711 of area E, adds the value of area C to the value of the accumulator, subtracts the value of the next address of area E (this is being indicated by ($E_{up}$) in the flow chart of FIG. 13) from that result, and restores that result in area C.

At this time it means that the first step of study operation for shifting to the control of high resolution ended. In the following the meaning of a series of processes from processing block 1314 to processing block 1323 will be explained.

First, a precondition for shifting from branch 907 to processing block 908 is the same as the first embodiment. It is for improving the compensation precision on study operation.

FIG. 14 is obtained by taking the amount of speed change per value that is the difference of the expected speed and the measured speed towards the speed change of the second section, third section, fourth section, fifth section, sixth section, seven section and eighth section in the case of it starts from time $t_8$. The rotational speed of the motor 1 has been increased by constant acceleration. The axis of the abscissa is the value of the speed change, and the axis of the ordinary is the value of the difference. Its calculation is based on the equations (5), (6).

In equation (5), t indicates time, $\alpha$ is the coefficient which fixes the output signal frequency of the speed detector 2; k of equation (6) is the rate of speed increase of the motor 1, that is the coefficient which fixes the size of the axis of abscissa of FIG. 14, and the other coefficients correspond to those of equation (1). In the third section and seven section the value of $(\Delta P - \Delta M)/\Delta N$ becomes a negative number (because of the influence of the increase of amplitude is very large) and it is plotted in the same quadrant.

From FIG. 14, the changing ratios at each section differ greatly, but if we consider the rotational speed of the motor 1 changes in few-tenth percents in one-eighth period of the output signal of the speed detector 2 is impossible, in the same section, we know that speed increasing ratio does not change very much in the limit of practical use.

FIG. 15 shows the rate of change of the first section after one period of the speed detector 2 when started from the first section. In practical limit the rate of change of the first section is 2.0. In the flow chart indicated in FIG. 13, this feature is used to increase the compensation precision. That is, the processes in the processing block 1316 are obtaining the amount of division error offset of the second section $O_2$ and the speed error of period conversion at the second section $E_2$ which are expressed by the following equations:

$$O_2 = (DP_1 - 5 \cdot \Delta E - DP_2)/5 \cdot B_0/(DP_1 - \Delta E) \quad (28)$$

$$E_2 = DP_2 - B_0 - O_2 \quad (29)$$

$DP_1$ is the measured value of the time interval of the first section from time $t_8$ to time $t_{11}$, and $DP_2$ is the measured value of the time interval of the second section from time $t_{11}$ to time $t_{12}$. $B_0$ is the value which the desired value which is stored in the area B is divided by 8, and this is stored in area B again. $\Delta E$ of equation (28) is the value which is stored in the area I of the RAM 7. Let the time interval of the first section from time $t_8$ to time $t_{11}$ be $DP_1$ and the time interval of the first section from time $t_{18}$ to time $t_{21}$ be $DP_{11}$, then $\Delta E$ is expressed by the following equation:

$$\Delta E = (DP_1 - DP_{11})/(8 \cdot 2.0) \quad (30)$$

That is, $\Delta E$ indicates the amount of speed change of each section. The denominator 2.0 of equation (30) is the rate of change of the first section obtained from FIG. 15.

In equation (30), $(DP_1 - 5 \cdot \Delta E - DP_2)$ is the difference of the expected value and the value which originally should be measured of the second section. The second term of the right-hand side of equation (4) is obtained by dividing that difference by the ratio of measured section. Further, the division error component is obtained by multiplying the ratio of $B_0/(DP_1 - \Delta E)$ which is converted from the period of section when the rotational speed of the motor 1 is at neighborhood of the fixed value. $B_0$ is the desired value of rotational speed, and $(DP_1 - \Delta E)$ is the rotational speed at measuring time.

The processes in the processing block 1317 are obtaining the amount of division error offset of the third section $O_3$ and the speed error of period conversion at the third section $E_3$ which are expressed by the following equations:

$$O_3 = (DP_1 + 16 \cdot \Delta E - DP_3)/16 \cdot B_0/(DP_1 - 2 \cdot \Delta E) \quad (31)$$

$$E_3 = DP_3 - B_0 - O_3 \quad (32)$$

The fixed value 16 of equation (31) is the rate of change of the third section obtained from FIG. 14. In equation (31), in the third section despite the rotational speed is increasing more than the second section, the executing of $(DP_1 + 16 \cdot \Delta E)$, as explained previously, is based on the reason that the polarities of the rate of change at the third section and the seventh section are becoming opposite to those at other sections.

On the other hand, the processes in the processing block 1318 are obtaining the amount of division error offset of the fourth section $O_4$ and the speed error of period conversion at the fourth section $E_4$ which are expressed by the following equations:

$$O_4 = (DP_1 - 6.5 \cdot E - DP_4)/6.5 \cdot B_0/(DP_1 - 3 \cdot \Delta E) \quad (33)$$

$$E_4 = DP_4 - B_0 - O_4 \quad (34)$$

The fixed value 6.5 of equation (33) is the rate of change of the fourth section obtained from FIG. 14.

Further, the processes in the processing block 1319 are obtaining the amount of division error offset of the fifth section $O_5$ and the speed error of period conversion at the fifth section $E_5$ which are expressed by the following equations:

$$O_5 = (DP_1 - 5 \cdot \Delta E - DP_5)/5 \cdot B_0/(DP_1 - 4 \cdot \Delta E) \quad (35)$$

$$E_5 = DP_5 - B_0 - O_5 \quad (36)$$

The fixed value 5 of equation (35) is the rate of change of the fifth section obtained from FIG. 14.

Similarly, the processes in the processing block 1320 are obtaining the amount of division error offset of the sixth section $O_6$ and the speed error of period conversion at the sixth section $E_6$ which are expressed by the following equations:

$$O_6 = (DP_1 - 13 \cdot \Delta E - DP_6)/13 \cdot B_0/(DP_1 - 5 \cdot \Delta E) \quad (37)$$

$$E_6 = DP_6 - B_0 - O_6 \quad (38)$$

The fixed value 13 of equation (37) is the rate of change of the sixth section obtained from FIG. 14.

Similarly, the processes in the processing block 1321 are obtaining the amount of division error offset of the seventh section $O_7$ and the speed error of period conversion at the seventh section $E_7$ which are expressed by the following equations:

$$O_7 = (DP_1 + 32 \cdot \Delta E - DP_7)/32 \cdot B_0/(DP_1 - 6 \cdot \Delta E) \quad (39)$$

$$E_7 = DP_7 - B_0 - O_7 \quad (40)$$

The fixed value 32 of equation (39) is the rate of change of the fourth section obtained from FIG. 14.

The processes in the processing block 1322 are obtaining the amount of division error offset of the eighth section $O_8$ and the speed error of period conversion at the eighth section $E_8$ which are expressed by the following equations:

$$O_8 = (DP_1 - 13 \cdot \Delta E - DP_8)/13 \cdot B_0/(DP_1 - 7 \cdot \Delta E) \quad (41)$$

$$E_8 = DP_8 - B_0 - O_8 \quad (42)$$

The fixed value 13 of equation (41) is the rate of change of the fourth section obtained from FIG. 14.

Further, the processing block 1323 obtains the total of the amount of offsets from section 2 to section 8, divides that value by 8 and inverts its sign, adds this value to the value of area F of each section, and stores the result again. Following this, the block 1323, for modifying the value of area E of each section, divides the total of the amount of the offset of just now by 8, inverts its sign, subtracts this value from the value of area E of each section, and then restores the result. This is based on the total of the amount of offset becoming zero. But, because of the division error of the first section which is the reference of compensation the total of the amount of offset of each section does not become zero, but it becomes the value of 8 times the amount of offset of the first section. The amount of offset of the first section is added to the amount of each section. Thus, it is necessary to modify that values. Because of this, the total amount of offset will be made zero by subtracting the value which is obtained by dividing the total amount of offset by 8 from the amount of offset of each section. Also, the amount of offset of the first section can be obtained. Further, because the values of the computed error which occur in the process of obtaining the compensated value do not concentrate on one section but be dispersed in 8-divided sections, the influence of error almost disappears, resulting in improving the precision of compensation. Concerning the first section, because this is the section of zero cross in which the slope of the output signal of the speed detector 2 is at the steepest, the influence of division error is very hard to appear. This is the desirable section as a section of reference (concerning the fifth section too, can say the same thing).

In equations (29), (32), (34), (36), (38), (40) and (42), the amounts of offsets at the second, third, fourth, fifth, sixth, seventh, and eighth sections $O_2$, $O_3$, $O_4$, $O_5$, $O_6$, $O_7$ and $O_8$ are subtracted from the error at that time, but if this operation carries out only once until it shifts to the control of high resolution, after that because usually the offsets of $O_1$–$O_8$ are remained in the address 711 to address 718 of area E of the RAM 7, the process may shift to the control operations as indicated in the flow chart of FIG. 7.

Further, in spite of this, the offset at each section is remained in the area F of the RAM 7 for the restudy for further increasing the compensation precision. Or, in the case that the rotational speed of the motor 1 is changed, stopped once and then restarts, it is not necessary to carry out all the operations indicated in FIG. 9 or FIG. 13 again, but by referring to the amount of offset of area F, it is possible to shift to faster high resolution control.

In the processing blocks 919-927 or blocks 1315-1323, delicate compensation as indicated in equations (7)–(24) or (28)–(44) is executed, but whether these compensation are necessary or not should be judged in accordance with the system scale and condition. For example, if the compensation is carried out by using the signal of FIG. 8b in advance in the controlled state so that the rotational speed of the motor 1 be constant, the computation of multiplying $B_0/\{8\cdot(D_z/8-A)\}$ in equation (12) and the computation of multiplying $B_0/(DP_1-\Delta E)$ in equation (29) are not necessary. It is enough for the ALU 19 to have functions of adder and bit-shift (the multiplication of the fixed values which are indicated in FIG. 13 can easily be actualized by combination of add and shift as, for example, for increasing by 6.5 times, the right-shifted value, the left-shifted value and the twice left-shifted value may be added, whereby the construction becomes simple.

Thus, in this embodiment, until the process shifts to the control of high resolution the timing controller 26 makes the RAM and the ALU compute the deviation from the normal time, which equally divides the AC signal waveform of the speed detector 2, and the generating time of the output signal of the comparators 11, 12 which are outputted through the channel selector 5 from the section which includes the zero cross to the section which includes the zero cross of after one period of the output signal of the speed detector 2. By adding that computed result as the offset value to area E which stored the record of the speed error of the RAM 7, better control of precision becomes possible.

In this embodiment, we explained the reference of the compensation is the interval which includes the zero cross of earlier measurement time. But the reference may be the interval which includes the zero cross of later measurement time.

The servo system of this invention, by setting up several comparison points in the section of one or half cycle of the AC signal which possesses the speed information of motor, substantially obtains the same effect as obtained by using the speed detective signal which possesses higher frequency. The practical form of this invention is not restricted to the system with digital period detecting means of FIG. 1, and the control of the rotational speed of the motor which is indicated in the practical example. But in a linear motor, for example, the moving distance can be obtained at high precision by counting the output signal of FIG. 8j.

In the embodiment of FIG. 1 the offset controller 10 operates so that the high electric potential sections and the low electric potential sections of the output signal of the waveform shaper 4 become equal to each other. From the explanation till now it is obvious that, for example, because the count values of the counter 15 at time $t_{11}$, $t_{14}$, $t_{15}$ and $t_{18}$ of FIG. 8, $D_{11}$, $D_{14}$, $D_{15}$ and $D_{18}$ are stored in the RAM 7 once, the offsets can be adjusted based on these data. That is, by adjusting the input offset value of the voltage controlled amplifier 3 so that [$D_{11}$-$D_{14}$] become equal to [$D_{15}$-$D_{18}$], the result becomes the same as making the duty of the waveform shaper to 1:1. Also, the unbalance of the upper side output and the lower side output of the programmable voltage source 6 can be compensated.

Further, if the difference of [$D_{11}$-$D_{14}$] and [$D_{15}$-$D_{18}$] is accurately zero, the number of addresses of the RAM 7 which is indicated in FIG. 6 can be reduced to half. That is, in the embodiment the section of one cycle from time $t_1$ to time $t_{11}$ of FIG. 8 is used as a reference. For example, at time $t_{11}$ the count value at time $t_{11}$ is subtracted from the count value at time $t_1$ of the counter 15. But, the section of half cycle from time $t_1$ to time $t_5$ may be used as a reference. If, at time $t_5$, the count value at time $t_5$ is subtracted from the count value at time $t_1$, the areas from address 705 to address 708, from address 715 to address 718 and from address 725 to address 728 in the RAM areas of FIG. 6 become not necessary.

And, under the predetermined frequency, if it is adjusted so that the period between time $t_2$ and time $t_3$ or between time $t_6$ and time $t_7$ of FIG. 8 becomes constant, by making use of the fact that the amplitude of the signal waveform of FIG. 8 is constant, the amplitude can be adjusted digitally. For example, the amplitude controller 9 of FIG. 1 can be constructed by an up-down counter (it may be a software counter which is constructed in the additional areas of the RAM) and a digital-analog converter. If it is made so that when the period between time $t_2$ and time $t_3$ or the period between time $t_6$ and time $t_7$ exceed the upper limit value the up-down counter counts down, and when exceed the lower limit value the up-down counter counts up, the amplitude can be adjusted step by step. Because the count values of the counter 15 at time $t_2$, $t_3$, $t_6$, $t_7$ are once put in the RAM 7, a series of operations can be performed also by the timing controller 26, the RAM 7 and the ALU 19.

Further, after a series of processes of error compensation shown in FIG. 9 or FIG. 13 have finished, the output signal of the amplitude controller 9 is supplied to the voltage controlled amplifier 3. In this case, the point of carrying out fixation of the amplified gain of the voltage controlled amplifier 3 by the amplitude controller 9 can be freely selected at each point in one cycle of time $t_1$ to time $t_8$. In the period of at least from a section of zero cross to a section of next zero cross of the signal waveform of FIG. 8a the fixed value is remained. Therefore, as explained previously, the detected gains of the speed error of each section from a section of zero cross to a section of next zero cross become different values as indicated in FIG. 14. In the flow chart of FIG. 7, the compensation towards the variation of this detected gain is not mentioned. But, for example, the processing block 206 of FIG. 7, before transfers the value of the accumulator to the latch 22, can also do compensation by the gain compensation table which is prepared in advance.

Further, as soon as the motor 1 is started, because the amplitude of output signal of the speed detector 2 is very small, even if the output signal of comparator 11 at time $t_1$ of FIG. 8 is generated, until the step indicated in FIG. 8a the electric potential of the output signal of the voltage controlled amplifier 3 does not rise, so that at time $t_2$ the comparator 11 will not generate the output signal.

However, in the embodiment indicated in FIG. 1, the second comparator 12 is provided separately from comparator 11 in order to always watch the rise and fall of the electric potential of the output signal of the voltage controlled amplifier 3. Also, the up-down counter of the channel selector 5 is reset at time $t_x$, $t_y$. Therefore, when starting the motor 1 the channel selector will not send out an undesired address selective signal to the RAM 7.

Further, by preparing both of the first comparator 11 and the second comparator 12, such effect that the system do not misoperate is obtained even if surging pulses mix in the output signal of the speed detector 2. For example, between time $t_1$ and time $t_2$ of FIG. 8, if a surging pulse which is greater than the step value of the output voltage of the programmable voltage source 6 is superposed on the output signal of the voltage controlled amplifier 3, both of the comparator 11 and comparator 12 generate outputs which have some time difference (because, most of the surge noises possess ringing shape and appear in the upper and lower sides of waveform diagram). By suitablly setting the acceptance condition of input signal at the channel selector 5 (for example, it is fixed to forbid the acceptance when the output signals of both comparators have arrived within one period of the clock signal), the noise-resistance of the system can be remarkably improved.

Further, if the trouble of this kind of noise does not exist, then the output terminal 6b of the programmable voltage source 6 and the comparator 12 can be eliminated. By making use of the output terminal 6a and the comparator 11 time-divisionally, the system with a digital period detecting means of FIG. 1 can also actualize the operating functions which are indicated in FIG. 8f, 8g, 8h, 8i.

Further, the explanations till now are assumed that the output signal of the speed detector 2 of FIG. 1 is a sine wave for explaining the variation of the detected gain of speed error at each sampling point. But the output signal of the speed detector 2 may be a triangle wave. In this case, if the amplitude is not changed by the rotational speed of the motor 1 (for example, in the case that the speed detector 2 is constructed by a shutter plate and a photo detector in which the light transmission factor gradually changes corresponding to the rotational position), because the detected gains of the speed errors at each sampling point do not change, the amplitude controller 9 also becomes not necessary.

Further, in the embodiment of FIG. 1 the count value of 16-bit length of the counter 15 is directly transferred to the ALU 19, and the computed value at the ALU 19 is transferred to the latch 22 through the data bus 21. In this case, if the computed result of 16-bit length is directly transferred to the latch 22, the error detected gain (discrimination gain) becomes very small. For example, in the example of equation (2) when the rotational speed is changed by 10 percents, the error detected value equal to 260 is calculated. If the total bit length is 16 bits, this value becomes only 0.4 percent, so that very high resolution and gain are required for the power amplifier of FIG. 1. Therefore, actually in the exchange and the computation processes of the data between the ALU 19 and the RAM 7, it is necessary to carry out bit-compression operation which increases the error detected gain.

The concrete method of bit-compression, the concrete example of the ALU 19 and the timing controller 26 of FIG. 1 and the exchange of data with the read-only memory (ROM) which is not indicated in FIG. 1 are explained in detail in Japanese Published Patent No. 58-183760.

What is claimed is:

1. A servo system for controlling moving speed of a moving body comprising:

discriminating means for measuring a period of an AC signal which contains a speed information of said moving body, setting at least two reference points within a half period of said AC signal, and generating an error information corresponding to a deviation value from a desired value at each reference point; and drive means for driving said moving body in accordance with said error information.

2. A servo system for controlling moving speed of a moving body comprising:

a voltage source which generates at least two kinds of predetermined voltages;

a comparator for comparing a voltage of an AC signal which contains a speed information of said moving body with each of said predetermined voltages generated by said voltage source and generating at least two output signals within a half period of said AC signal;

a counter for counting reference clock signals;

a memory for storing a count value of said counter when said comparator generates each of said output signals;

a processor for calculating a speed error value from said count value stored in said memory; and drive means for supplying a driving power to said moving body in accordance with said speed error value thereby to keep a desired speed of said moving body.

3. The system according to claim 2, wherein said processor subtracts each count value of said counter from a previous count value of said counter to obtain a time interval between times at which said comparator generates said output signals and calculates a deviation value of said time interval from a predetermined time interval value, said deviation value being outputted as said speed error value.

4. The system according to claim 3, further comprising error compensation means which obtains a voltage shift of said predetermined voltages from count values of said counter stored in said memory and compensates said speed error value according to said voltage shift.

5. The system according to claim 4, further comprising a channel selector for selecting an address for said memory in response to each of said output signals of said comparator, and a timing controller for controlling said processor and said error compensation means in such a way that said processor obtains said time interval and stores said time interval into said memory each time said channel selector renews said address and that said error compensation means, when time intervals in at least a half period of said AC signal have been stored in said memory, detects said voltage shift by comparing said time intervals stored in said memory and compensates said speed error value.

6. The system according to claim 3, further comprising error compensation means which corrects said deviation value so that each said time interval is equal to another said time interval within a half period of said AC signal in accordance with a half period of said AC signal and said predetermined time interval value, thereby to compensate said speed error value.

7. The system according to claim 6, further comprising a channel selector for selecting an address for said memory in response to each of said output signals of said comparator, and a timing controller for controlling said processor and said error compensation means in such a way that said processor obtains said time interval and stores said time interval into said memory each time said channel selector renews said address and that said error compensation means, when time intervals in at least a half period of said AC signal have been stored in said memory, detects said voltage shift by comparing said time intervals stored in said memory and compensates said speed error value.

8. The system according to claim 3, further comprising error compensation means which obtains a reference deviation value from a time interval in a time including a zero-cross point of said AC signal and said predetermied time interval value, and compensates said speed error value according to a difference between said deviation value and said reference deviation value, said difference representing a voltage shift of said predetermined voltages.

9. The system according to claim 8, further comprising a channel selector for selecting an address for said memory in response to each of said output signals of said comparator, and a timing controller for controlling said processor and said error compensation means in such a way that said processor obtains said time interval and stores said time interval into said memory each time said channel selector renews said address and that said error compensation means, when time intervals in at least a time period of said AC signal including said time including said zero-cross point have been stored in said memory, detects said voltage shift by comparing said deviation value with said reference deviation value which are stored in said memory and compensates said speed error value.

* * * * *